(12) United States Patent
Jung et al.

(10) Patent No.: US 11,009,177 B2
(45) Date of Patent: **\*May 18, 2021**

(54) VACUUM ADIABATIC BODY AND REFRIGERATOR

(71) Applicant: LG ELECTRONICS INC., Seoul (KR)

(72) Inventors: Wonyeong Jung, Seoul (KR); Deokhyun Youn, Seoul (KR)

(73) Assignee: LG ELECTRONICS INC., Seoul (KR)

( \* ) Notice: Subject to any disclaimer, the term of this patent is extended or adjusted under 35 U.S.C. 154(b) by 0 days.

This patent is subject to a terminal disclaimer.

(21) Appl. No.: 16/482,104

(22) PCT Filed: Feb. 1, 2018

(86) PCT No.: PCT/KR2018/001385
§ 371 (c)(1),
(2) Date: Jul. 30, 2019

(87) PCT Pub. No.: WO2018/143691
PCT Pub. Date: Aug. 9, 2018

(65) Prior Publication Data
US 2020/0224815 A1 Jul. 16, 2020

(30) Foreign Application Priority Data
Feb. 2, 2017 (KR) .................. 10-2017-0014981

(51) Int. Cl.
*A47B 96/04* (2006.01)
*F16L 59/065* (2006.01)
*F25D 23/06* (2006.01)

(52) U.S. Cl.
CPC .......... *F16L 59/065* (2013.01); *F25D 23/063* (2013.01); *F25D 23/065* (2013.01); *F25D 2201/14* (2013.01)

(58) Field of Classification Search
CPC .... F25D 23/063; F25D 23/065; F25D 23/066; F25D 2201/14
See application file for complete search history.

(56) References Cited

U.S. PATENT DOCUMENTS 3,305,986 A * 2/1967 Mathews ............. F25D 23/063
52/270
5,500,305 A * 3/1996 Bridges .................. E04B 1/803
428/621

(Continued)

FOREIGN PATENT DOCUMENTS

CN 1806153 7/2006
CN 102455105 5/2012

(Continued)

OTHER PUBLICATIONS

International Search Report (Full English Text) and Written Opinion dated May 30, 2018 issued in Application No. PCT/KR2018/001385.

(Continued)

Primary Examiner — Matthew W Ing
(74) Attorney, Agent, or Firm — Ked & Associates LLP

(57) ABSTRACT

A vacuum adiabatic body includes a first plate, a second plate, a seal that seals the first plate and the second plate to provide a space between the first plate and the second plate in a vacuum state, a support including at least a pair of support plates that maintain a distance between the first and second plates, a thermal insulator including at least one radiation resistance sheet provided between the pair of support plates to reduce heat transfer between the first plate and the second plate, and an exhaust port through which a gas in the space is exhausted.

20 Claims, 17 Drawing Sheets

(56) References Cited

U.S. PATENT DOCUMENTS

| | | | |
|---|---|---|---|
| 6,260,360 B1* | 7/2001 | Wheeler | A01N 1/02 62/3.6 |
| 6,854,276 B1 | 2/2005 | Yuan et al. | |
| 2001/0033126 A1* | 10/2001 | Nishimoto | F25D 23/062 312/406 |
| 2004/0226956 A1 | 11/2004 | Brooks | |
| 2012/0104923 A1* | 5/2012 | Jung | F25D 23/066 312/406 |
| 2013/0105494 A1* | 5/2013 | Jung | F25D 23/062 220/592.05 |
| 2013/0105496 A1* | 5/2013 | Jung | F25D 23/062 220/592.05 |
| 2013/0111942 A1* | 5/2013 | Jung | F25B 40/00 62/440 |
| 2013/0257257 A1* | 10/2013 | Cur | B29C 65/002 312/406.1 |
| 2016/0047593 A1 | 2/2016 | Jung et al. | |
| 2018/0224197 A1* | 8/2018 | Jung | F25D 23/082 |
| 2020/0182393 A1* | 6/2020 | Jung | F25D 23/065 |

FOREIGN PATENT DOCUMENTS

| | | |
|---|---|---|
| CN | 105371579 | 3/2016 |
| DE | 10-2011-002250 | 10/2011 |
| EP | 3332187 | 6/2018 |
| JP | 2000-320958 | 11/2000 |
| JP | 2007-253974 | 10/2007 |
| KR | 10-0343719 | 6/2002 |
| KR | 10-2015-0012712 | 2/2015 |
| KR | 10-2013-0048530 | 2/2018 |
| WO | WO 2011/016693 | 2/2011 |

OTHER PUBLICATIONS

European Search Report dated Oct. 22, 2020 issued in Application No. 18748799.6.
Chinese Office Action dated Sep. 22, 2020 issued in Application No. 201880010103.2.

* cited by examiner (a)

(b)

(c)

VACUUM ADIABATIC BODY AND REFRIGERATOR

CROSS-REFERENCE TO RELATED PATENT APPLICATIONS

This application is a U.S. National Stage Application under 35 U.S.C. § 371 of PCT Application No. PCT/KR2018/001385, filed Feb. 1, 2018, which claims priority to Korean Patent Application No. 10-2017-0014981, filed Feb. 2, 2017, whose entire disclosures are hereby incorporated by reference.

TECHNICAL FIELD

The present disclosure relates to a vacuum adiabatic body and a refrigerator.

BACKGROUND ART

A vacuum adiabatic body is a product for suppressing heat transfer by vacuuming the interior of a body thereof. The vacuum adiabatic body may reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 cm or more is generally provided. However, the internal volume of the refrigerator is therefore reduced.

In order to increase the internal volume of a refrigerator, there is an attempt to apply a vacuum adiabatic body to the refrigerator.

First, Korean Patent No. 10-0343719 (Reference Document 1) of the present applicant has been disclosed. According to Reference Document 1, there is disclosed a method in which a vacuum adiabatic panel is prepared and then built in walls of a refrigerator, and the exterior of the vacuum adiabatic panel is finished with a separate molding as Styrofoam (polystyrene). According to the method, additional foaming is not required, and the adiabatic performance of the refrigerator is improved. However, fabrication cost is increased, and a fabrication method is complicated. As another example, a technique of providing walls using a vacuum adiabatic material and additionally providing adiabatic walls using a foam filling material has been disclosed in Korean Patent Publication No. 10-2015-0012712 (Reference Document 2). According to Reference Document 2, fabrication cost is increased, and a fabrication method is complicated.

As another example, there is an attempt to fabricate all walls of a refrigerator using a vacuum adiabatic body that is a single product. For example, a technique of providing an adiabatic structure of a refrigerator to be in a vacuum state has been disclosed in U.S. Patent Laid-Open Publication No. US2004226956A1 (Reference Document 3). However, it is difficult to obtain a practical level of an adiabatic effect by providing a wall of the refrigerator with sufficient vacuum. In detail, there are limitations that it is difficult to prevent a heat transfer phenomenon at a contact portion between an outer case and an inner case having different temperatures, it is difficult to maintain a stable vacuum state, and it is difficult to prevent deformation of a case due to a negative pressure of the vacuum state. Due to these limitations, the technology disclosed in Reference Document 3 is limited to a cryogenic refrigerator, and does not provide a level of technology applicable to general households.

DISCLOSURE

Technical Problem

Embodiments provide a vacuum adiabatic body that is improved in adiabatic performance.

Technical Solution

In one embodiment, a vacuum adiabatic body includes a supporting unit including at least a pair of support plates to maintain a distance so at to maintain a vacuum space part and a heat resistance unit at least including at least one radiation resistance sheet provided between the pair of support plates, wherein an edge of the radiation resistance sheet is disposed inside a virtual line directly connecting edges of the pair of support plates to each other. Thus, one radiation resistance sheet may prevent heat loss, which occurs when coming into contact with an external other part, from occurring. The radiation resistance sheet may be a thin plate shape product and be deformable by an external impact to solve the above-described limitation.

When two or more radiation resistance sheets are provided, a spacing block may be interposed in the spacing part between the radiation resistance sheets to block heat transfer between the sheets.

The pair of support plates may include a first support plate coming into contact with the first plate member and a second support plate coming into contact with the second plate member. Here, the second support plate may have a size greater than that of the first support plate. In this case, the vacuum adiabatic body may be reinforced in strength to firm a contact part of the second support plate.

The virtual line may be provided as an angle of about 45 degrees to improve stability of the contact part between the supporting units and prevent adiabatic performance from being deteriorated due to contact between parts. Here, the angle of about 45 degrees may be defined as an angle that is inclined with respect to an extension direction of the supporting unit.

The supporting unit may include: a first bar supporting the radiation resistance sheet; and a second bar which does not support the radiation resistance sheet. Thus, heat loss due to heat conduction that may occur between the radiation resistance sheet and the bar may be prevented. In the first bar, an entire inner circumferential surface of the first bar may not come into contact with the radiation resistance sheet. For example, the first bar and the radiation resistance sheet may come into contact with each other only at an end of four corners of one radiation resistance sheet. The first bar may come into contact with the radiation resistance sheet due to a slight deformation of the radiation resistance sheet due to aging.

A distance from a supporting point at which the first bar supports the radiation resistance sheet to an edge of the radiation resistance sheet may be less than that from the supporting point to the virtual line. Thus, even though the radiation resistance sheet is deformed, the radiation resistance may not pass through the virtual line to block the heat transfer between the radiation resistance sheets. The edge of the radiation resistance sheet may extend by a distance of about 10 mm to about 15 mm from the supporting point.

The radiation resistance sheet may have emissivity less than that of the plate member to resist radiation heat transfer, thereby more improving the adiabatic performance.

In another embodiment, a refrigerator includes: a main body having an internal space in which storage goods are stored and provided as a vacuum adiabatic body; and a door provided to open/close the main body from an external space. Two or more supporting units coming into contact with each other to maintain a vacuum space part. The supporting unit may include: a first support plate supported by the first plate member; a second support plate supported by the second plate member; and a bar connecting the first support plate to the second support plate. The bar may maintain a distance between the first support plate and the second support plate, and an edge area of the radiation resistance sheet may be disposed inside a virtual line connecting the first support plate to the second support plate with the shortest distance. Thus, even though the radiation resistance sheet is deformed, sealing performance of the radiation heat transfer may not be deteriorated.

An end of a side of one supporting unit may come into contact with the first support plate of the other supporting unit so as to be firmly maintained at a contact point of each of the supporting units. An end of a side of one supporting unit may include an end of the first support plate of the one supporting unit and an end of the second support plate. The contact of the radiation resistance sheet of the supporting units may be completely prevented.

An end of a side of one supporting unit may come into contact with an end of a side of the other supporting unit. The two or more supporting units may come into contact with the same support plate. In this case, the supporting unit may be reinforced in strength by contact force between the support plates.

In further another embodiment, in a vacuum adiabatic body, even though a radiation resistance sheet is deformed, an edge of the radiation resistance sheet may be disposed inside a straight line connecting edges of the pair of support plates to each other, and a first hole into which the bar is inserted may be defined in the radiation resistance sheet.

To improve productivity of a product through temporary assembly of the support plate, the vacuum adiabatic body may further include: a seating rib disposed on the support plate; and an insertion groove provided in the radiation resistance sheet to allow the seating rib to pass therethrough. Here, the insertion groove may be provided in an edge of the radiation resistance sheet to prevent the radiation heat from having a bad influence on the adiabatic function of the radiation resistance sheet.

At least two or more supporting units may be provided, and an end of one supporting unit may come into contact with the first support plate of the other supporting unit to stably perform the supporting action of the two supporting unit.

Advantageous Effects

According to the embodiment, the adiabatic performance of the vacuum adiabatic body may be more improved.

BEST MODE

Hereinafter, exemplary embodiments will be described with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention.

The drawings shown below may be displayed differently from the actual product, or exaggerated or simple or detailed parts may be deleted, but this is intended to facilitate understanding of the technical idea of the present invention. It should not be construed as limited.

In the following description, the term 'vacuum pressure' means a certain pressure state lower than atmospheric pressure. In addition, the expression that a vacuum degree of A is higher than that of B means that a vacuum pressure of A is lower than that of B.

Figure 1:
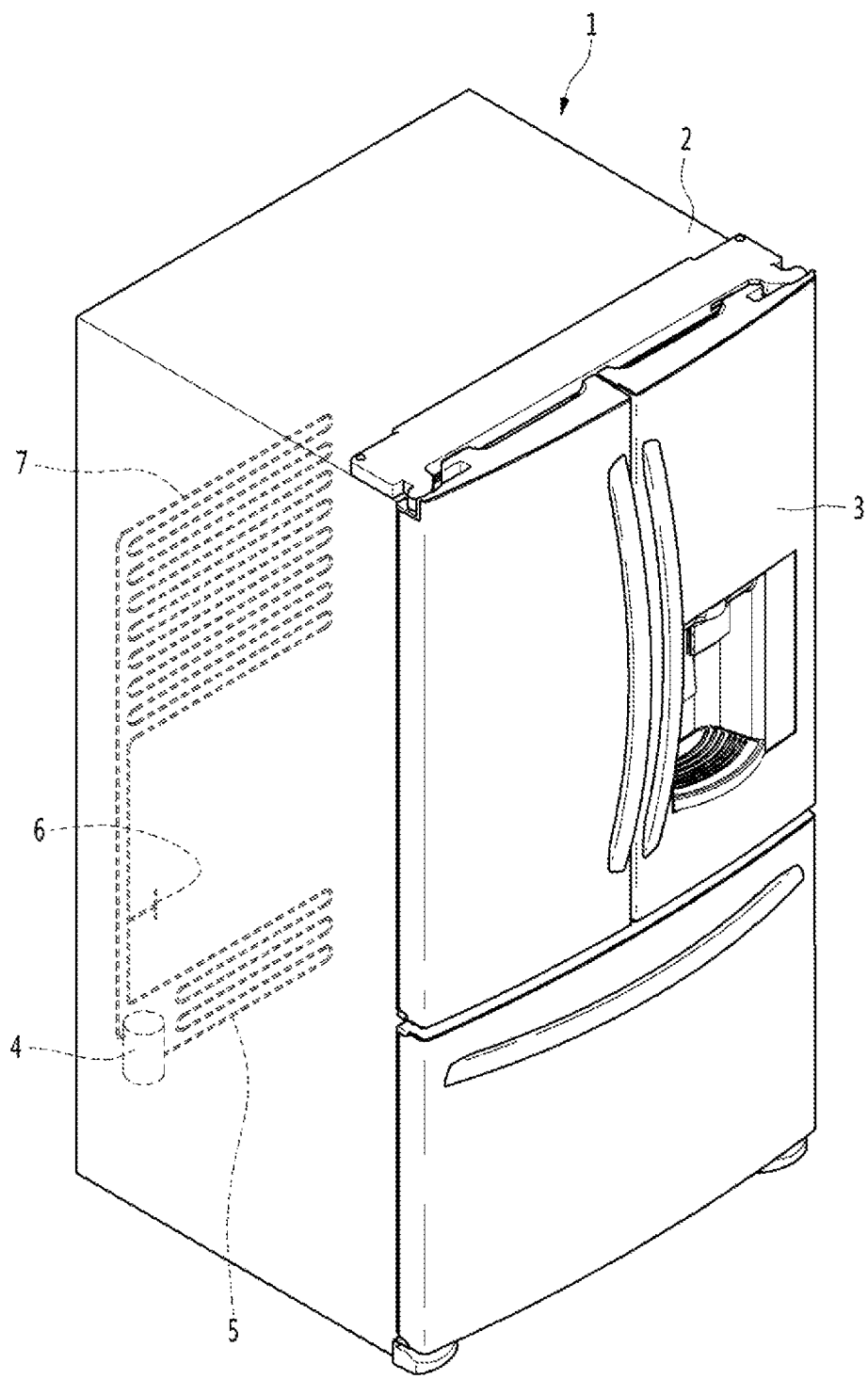
FIG. 1 is a perspective view of a refrigerator according to an embodiment.

FIG. 1 is a perspective view of a refrigerator according to an embodiment.

Referring to FIG. 1, the refrigerator 1 includes a main body 2 provided with a cavity 9 capable of storing storage goods and a door 3 provided to open/close the main body 2. The door 3 may be rotatably or movably disposed to open/close the cavity 9. The cavity 9 may provide at least one of a refrigerating chamber and a freezing chamber.

Parts constituting a freezing cycle in which cold air is supplied into the cavity 9. Specifically, the parts include a compressor 4 for compressing a refrigerant, a condenser 5 for condensing the compressed refrigerant, an expander 6 for expanding the condensed refrigerant, and an evaporator 7 for evaporating the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

Figure 2:
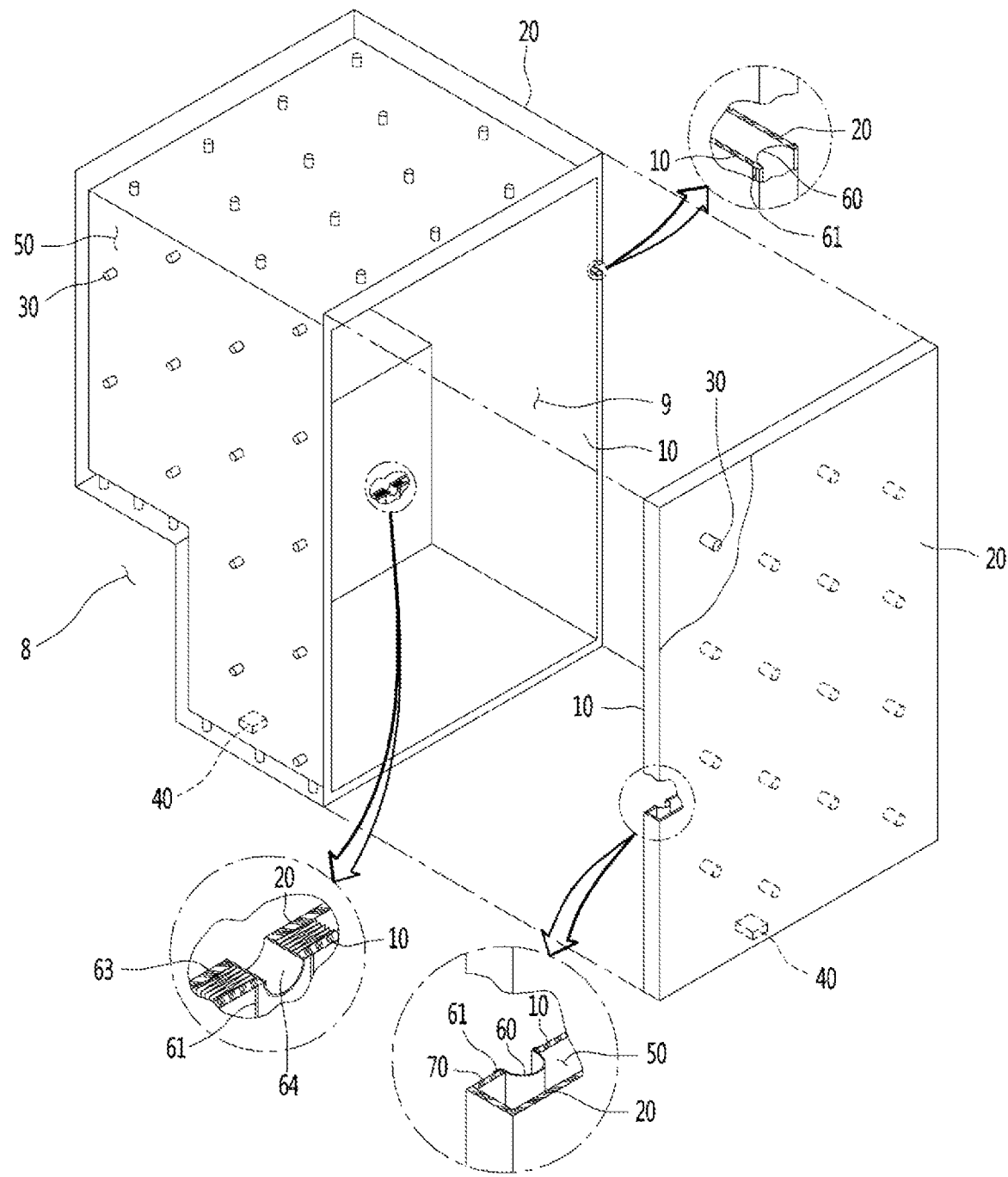
FIG. 2 is a view schematically illustrating a vacuum adiabatic body used in a main body and a door of the refrigerator.

FIG. 2 is a view schematically illustrating a vacuum adiabatic body used in the main body and the door of the refrigerator. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets are provided are schematically illustrated for convenience of understanding.

Referring to FIG. 2, the vacuum adiabatic body includes a first plate member (or first plate) 10 for providing a wall of a low-temperature space, a second plate member (or second plate) 20 for providing a wall of a high-temperature space, a vacuum space part (or vacuum space) 50 defined as a gap part between the first and second plate members 10 and 20. Also, the vacuum adiabatic body includes the conductive resistance sheets 60 and 63 for preventing heat conduction between the first and second plate members 10 and 20. A sealing part (or seal) 61 for sealing the first and second plate members 10 and 20 is provided such that the vacuum space part 50 is in a sealing state. When the vacuum adiabatic body is applied to a refrigerating or heating cabinet, the first plate member 10 may be referred to as an inner case, and the second plate member 20 may be referred to as an outer case. A machine chamber 8 in which parts providing a freezing cycle are accommodated is placed at a lower rear side of the main body-side vacuum adiabatic body, and an exhaust port 40 for forming a vacuum state by exhausting air in the vacuum space part 50 is provided at any one side of the vacuum adiabatic body. In addition, a conduit 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. Here, the wall for each space may serve as not only a wall directly contacting the space but also a wall not contacting the space. For example, the vacuum adiabatic body of the embodiment may also be applied to a product further having a separate wall contacting each space.

Factors of heat transfer, which cause loss of the adiabatic effect of the vacuum adiabatic body, are heat conduction between the first and second plate members 10 and 20, heat radiation between the first and second plate members 10 and 20, and gas conduction of the vacuum space part 50.

Hereinafter, a heat resistance unit provided to reduce adiabatic loss related to the factors of the heat transfer will be provided. Meanwhile, the vacuum adiabatic body and the refrigerator of the embodiment do not exclude that another adiabatic means is further provided to at least one side of the vacuum adiabatic body. Therefore, an adiabatic means using foaming or the like may be further provided to another side of the vacuum adiabatic body.

Figure 3:
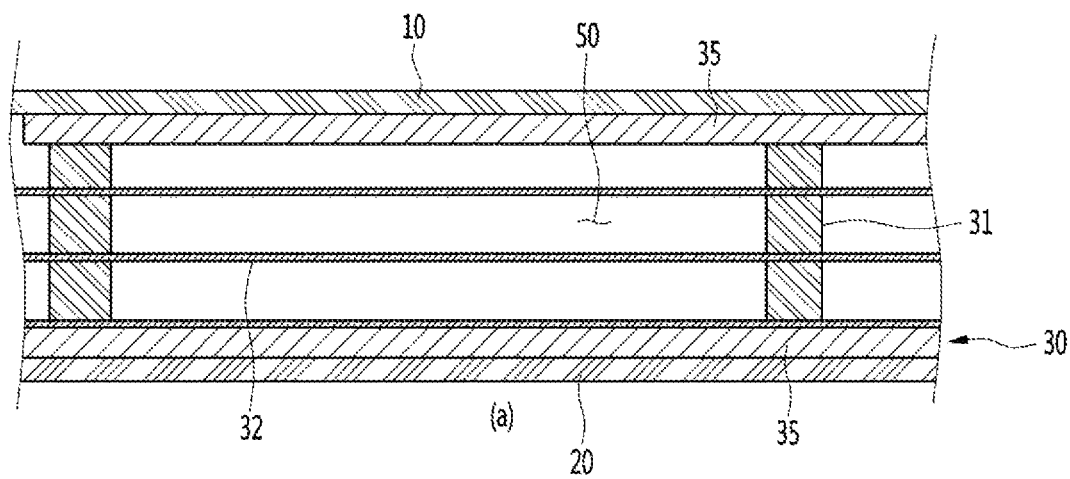
FIG. 3 is a view illustrating various embodiments of an internal configuration of a vacuum space part.
Figure 3:
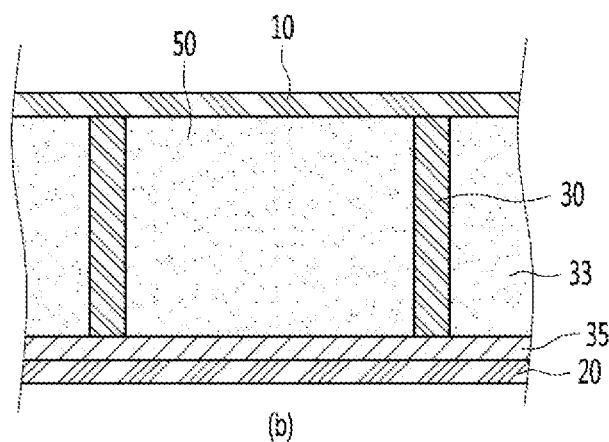
Figure 3:
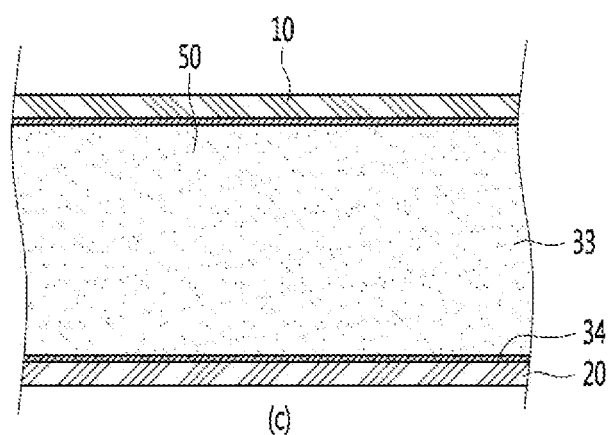

FIG. 3 is a view illustrating various embodiments of an internal configuration of the vacuum space part.

First, referring to FIG. 3a, the vacuum space part 50 is provided in a third space having a different pressure from the first and second spaces, preferably, a vacuum state, thereby reducing adiabatic loss. The third space may be provided at a temperature between the temperature of the first space and the temperature of the second space. Since the third space is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, adiabatic loss may be caused due to an increase in amount of heat radiation, caused by the contraction of the vacuum space part 50, and an increase in amount of heat conduction, caused by contact between the plate members 10 and 20.

A supporting unit (or support) 30 may be provided to reduce the deformation of the vacuum space part 50. The supporting unit 30 includes bars 31. The bars 31 may extend in a direction substantially vertical to the first and second plate members 10 and 20 so as to support a distance between the first and second plate members 10 and 20. A support plate 35 may be additionally provided to at least one end of the bar 31. The support plate 35 connects at least two bars 31 to each other, and may extend in a direction horizontal to the first and second plate members 10 and 20. The support plate 35 may be provided in a plate shape, or may be provided in a lattice shape such that its area contacting the first or second plate member 10 or 20 is decreased, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 may be diffused through the support plate 35.

A material of the supporting unit 30 may include a resin selected from the group consisting of PC, glass fiber PC, low outgassing PC, PPS, and LCP so as to obtain high compressive strength, low outgassing and water absorption, low thermal conductivity, high compressive strength at high temperature, and excellent machinability.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20. A product having a low emissivity may be preferably used as the material of the radiation resistance sheet 32. In an embodiment, an aluminum foil having an emissivity of 0.02 may be used as the radiation resistance sheet 32. Since the transfer of radiation heat cannot be sufficiently blocked using one radiation resistance sheet, at least two radiation resistance sheets 32 may be provided at a certain distance so as not to contact each other. In addition, at least one radiation resistance sheet may be provided in a state in which it contacts the inner surface of the first or second plate member 10 or 20.

Referring to FIG. 3b, the distance between the plate members is maintained by the supporting unit 30, and a porous substance 33 may be filled in the vacuum space part 50. The porous substance 33 may have a higher emissivity than the stainless material of the first and second plate members 10 and 20. However, since the porous substance 33 is filled in the vacuum space part 50, the porous substance 33 has a high efficiency for resisting the radiation heat transfer.

In this embodiment, the vacuum adiabatic body may be fabricated without using the radiation resistance sheet 32.

Referring to FIG. 3c, the supporting unit 30 maintaining the vacuum space part 50 is not provided. Instead of the supporting unit 30, the porous substance 33 is provided in a state in which it is surrounded by a film 34. In this case, the porous substance 33 may be provided in a state in which it is compressed so as to maintain the gap of the vacuum space part 50. The film 34 is made of, for example, a PE material, and may be provided in a state in which holes are formed therein.

In this embodiment, the vacuum adiabatic body may be fabricated without using the supporting unit 30. In other words, the porous substance 33 may simultaneously serve as the radiation resistance sheet 32 and the supporting unit 30.

Figure 4:
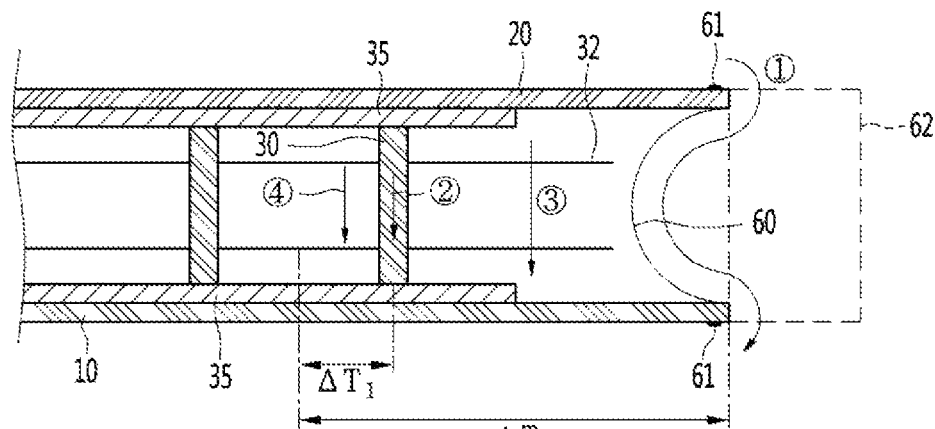
FIG. 4 is a view illustrating various embodiments of conductive resistance sheets and peripheral portions thereof.
Figure 4:
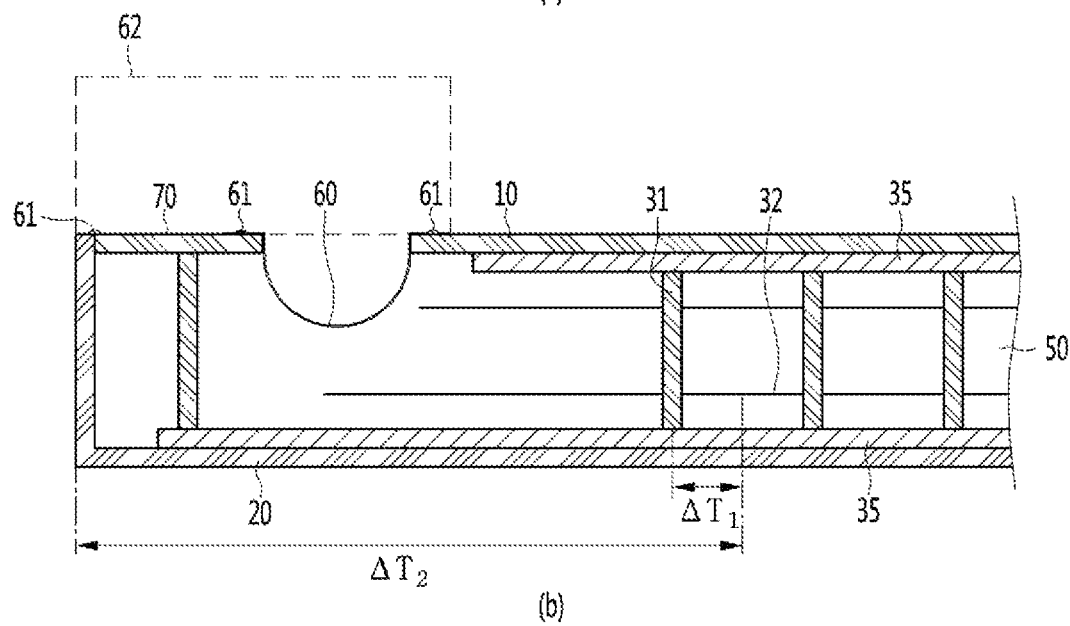
Figure 4:
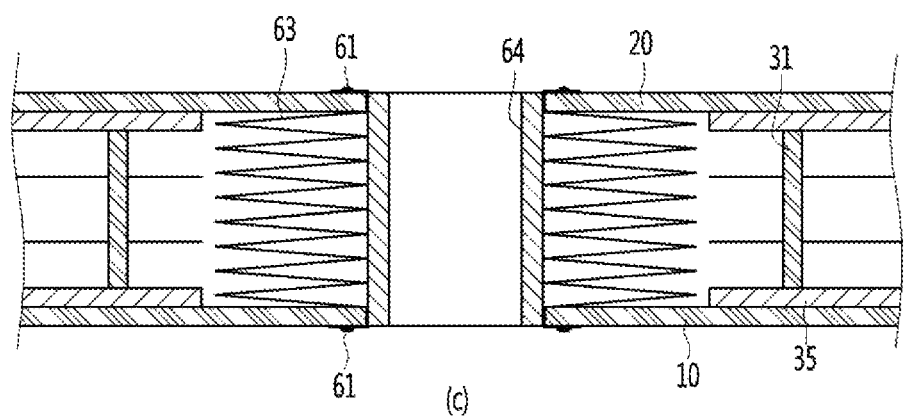

FIG. 4 is a view showing various embodiments of the conductive resistance sheets and peripheral parts thereof. Structures of the conductive resistance sheets are briefly illustrated in FIG. 2, but will be understood in detail with reference to FIG. 4.

First, a conductive resistance sheet proposed in FIG. 4a may be preferably applied to the main body-side vacuum adiabatic body. Specifically, the first and second plate members 10 and 20 are to be sealed so as to vacuum the interior of the vacuum adiabatic body. In this case, since the two plate members have different temperatures from each other, heat transfer may occur between the two plate members. A conductive resistance sheet 60 is provided to prevent heat conduction between two different kinds of plate members.

The conductive resistance sheet 60 may be provided with sealing parts 61 at which both ends of the conductive resistance sheet 60 are sealed to defining at least one portion of the wall for the third space and maintain the vacuum state. The conductive resistance sheet 60 may be provided as a thin foil in unit of micrometer so as to reduce the amount of heat conducted along the wall for the third space. The sealing parts 61 may be provided as a welding part. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 61 are not limited to the welding parts, and may be provided through a process such as cocking. The conductive resistance sheet 60 may be provided in a curved shape. Thus, a heat conduction distance of the conductive resistance sheet 60 is provided longer than the linear distance of each plate member, so that the amount of heat conduction may be further reduced.

A change in temperature occurs along the conductive resistance sheet 60. Therefore, in order to block heat transfer to the exterior of the conductive resistance sheet 60, a shielding part (or shield) 62 may be provided at the exterior of the conductive resistance sheet 60 such that an adiabatic action occurs. In other words, in the refrigerator, the second plate member 20 has a high temperature and the first plate member 10 has a low temperature. In addition, heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur. In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shielding part 62 may be provided as a porous substance contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body and the door are opened, the shielding part 62 may be preferably provided as a porous substance or a separate adiabatic structure.

A conductive resistance sheet proposed in FIG. 4b may be preferably applied to the door-side vacuum adiabatic body. In FIG. 4b, portions different from those of FIG. 4a are described in detail, and the same description is applied to portions identical to those of FIG. 4a. A side frame 70 is further provided at an outside of the conductive resistance sheet 60. A part for sealing between the door and the main body, an exhaust port necessary for an exhaust process, a getter port (or vacuum port) for vacuum maintenance, and the like may be placed on the side frame 70. This is because the mounting of parts is convenient in the main body-side vacuum adiabatic body, but the mounting positions of parts are limited in the door-side vacuum adiabatic body.

In the door-side vacuum adiabatic body, it is difficult to place the conductive resistance sheet 60 at a front end portion of the vacuum space part, i.e., a corner side portion of the vacuum space part. This is because, unlike the main body, a corner edge portion of the door is exposed to the exterior. More specifically, if the conductive resistance sheet 60 is placed at the front end portion of the vacuum space part, the corner edge portion of the door is exposed to the exterior, and hence there is a disadvantage in that a separate adiabatic part should be configured so as to heat-insulate the conductive resistance sheet 60.

A conductive resistance sheet proposed in FIG. 4c may be preferably installed in the conduit passing through the vacuum space part. In FIG. 4c, portions different from those of FIGS. 4a and 4b are described in detail, and the same description is applied to portions identical to those of FIGS. 4a and 4b. A conductive resistance sheet having the same shape as that of FIG. 4a, preferably, a wrinkled conductive resistance sheet 63 may be provided at a peripheral portion of the conduit 64. Accordingly, a heat transfer path may be lengthened, and deformation caused by a pressure difference may be prevented. In addition, a separate shielding part may be provided to improve the adiabatic performance of the conductive resistance sheet.

A heat transfer path between the first and second plate members 10 and 20 will be described with reference back to FIG. 4a. Heat passing through the vacuum adiabatic body may be divided into surface conduction heat ① conducted along a surface of the vacuum adiabatic body, more specifically, the conductive resistance sheet 60, supporter conduction heat ② conducted along the supporting unit 30 provided inside the vacuum adiabatic body, gas conduction heat ③ conducted through an internal gas in the vacuum space part, and radiation transfer heat ④ transferred through the vacuum space part.

The transfer heat may be changed depending on various depending on various design dimensions. For example, the supporting unit may be changed such that the first and second plate members 10 and 20 may endure a vacuum pressure without being deformed, the vacuum pressure may be changed, the distance between the plate members may be changed, and the length of the conductive resistance sheet may be changed. The transfer heat may be changed depending on a difference in temperature between the spaces (the first and second spaces) respectively provided by the plate members. In the embodiment, a preferred configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ may become smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is largest. For example, the heat transfer amount by the solid conduction heat may reach 75% of the total heat transfer amount. A heat transfer amount by the radiation transfer heat ④ is smaller than the heat transfer amount by the solid conduction heat but larger than the heat transfer amount of the gas conduction heat ③. For example, the heat transfer amount by the radiation transfer heat ④ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math Formula 1.

eK solid conduction heat>eK radiation transfer heat>eK gas conduction heat      Math FIG. 1

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by $k=QL/A\Delta T$. Here, Q denotes a calorific value (W) and may be obtained using a calorific value of a heater. A denotes a sectional area (m2) of the vacuum adiabatic body, L denotes a thickness (m) of the vacuum adiabatic body, and $\Delta T$ denotes a temperature difference.

For the surface conduction heat, a conductive calorific value may be obtained through a temperature difference ($\Delta T$) between an entrance and an exit of the conductive resistance sheet 60 or 63, a sectional area (A) of the conductive resistance sheet, a length (L) of the conductive resistance sheet, and a thermal conductivity (k) of the conductive resistance sheet (the thermal conductivity of the conductive resistance sheet is a material property of a material and may be obtained in advance). For the supporter conduction heat, a conductive calorific value may be obtained through a temperature difference ($\Delta T$) between an entrance and an exit of the supporting unit 30, a sectional area (A) of the supporting unit, a length (L) of the supporting unit, and a thermal conductivity (k) of the supporting unit. Here, the thermal conductivity of the supporting unit is a material property of a material and may be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous substance is provided inside the vacuum space part 50, porous substance conduction heat ⑤ may be a sum of the supporter conduction heat ② and the radiation transfer heat ④. The porous substance conduction heat ⑤ may be changed depending on various variables including a kind, an amount, and the like of the porous sub stance.

According to an embodiment, a temperature difference $\Delta T1$ between a geometric center formed by adjacent bars 31 and a point at which each of the bars 31 is located may be preferably provided to be less than 0.5° C. Also, a temperature difference $\Delta T2$ between the geometric center formed by the adjacent bars 31 and an edge portion of the vacuum adiabatic body may be preferably provided to be less than 0.5° C. In the second plate member 20, a temperature difference between an average temperature of the second plate and a temperature at a point at which a heat transfer path passing through the conductive resistance sheet 60 or 63 meets the second plate may be largest. For example, when the second space is a region hotter than the first space, the temperature at the point at which the heat transfer path passing through the conductive resistance sheet meets the second plate member becomes lowest. Similarly, when the second space is a region colder than the first space, the temperature at the point at which the heat transfer path passing through the conductive resistance sheet meets the second plate member becomes highest.

This means that the amount of heat transferred through other points except the surface conduction heat passing through the conductive resistance sheet should be controlled, and the entire heat transfer amount satisfying the vacuum adiabatic body may be achieved only when the surface conduction heat occupies the largest heat transfer amount. To this end, a temperature variation of the conductive resistance sheet may be controlled to be larger than that of the plate member.

Physical characteristics of the parts constituting the vacuum adiabatic body will be described. In the vacuum adiabatic body, a force by vacuum pressure is applied to all of the parts. Therefore, a material having strength (N/m2) of a certain level may be preferably used.

Under such circumferences, the plate members 10 and 20 and the side frame 70 may be preferably made of a material having a sufficient strength with which they are not damaged by even vacuum pressure. For example, when the number of bars 31 is decreased so as to limit the support conduction heat, deformation of the plate member occurs due to the vacuum pressure, which may bad influence on the external appearance of refrigerator. The radiation resistance sheet 32 may be preferably made of a material that has a low emissivity and may be easily subjected to thin film processing. Also, the radiation resistance sheet 32 is to ensure strength enough not to be deformed by an external impact. The supporting unit 30 is provided with strength enough to support the force by the vacuum pressure and endure an external impact, and is to have machinability. The conductive resistance sheet 60 may be preferably made of a material that has a thin plate shape and may endure the vacuum pressure.

In an embodiment, the plate member, the side frame, and the conductive resistance sheet may be made of stainless materials having the same strength. The radiation resistance sheet may be made of aluminum having a weaker strength that the stainless materials. The supporting unit may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having strength, but the stiffness of the material is preferably low so as to increase heat resistance and minimize radiation heat as the conductive resistance sheet is uniformly spread without any roughness when the vacuum pressure is applied. The radiation resistance sheet 32 requires a stiffness of a certain level so as not to contact another part due to deformation. Particularly, an edge portion of the radiation resistance sheet may generate conduction heat due to drooping caused by the self-load of the radiation resistance sheet. Therefore, a stiffness of a certain level is required. The supporting unit 30 requires stiffness enough to endure a compressive stress from the plate member and an external impact.

In an embodiment, the plate member and the side frame may preferably have the highest stiffness so as to prevent deformation caused by the vacuum pressure. The supporting unit, particularly, the bar may preferably have the second highest stiffness. The radiation resistance sheet may preferably have a stiffness that is lower than that of the supporting unit but higher than that of the conductive resistance sheet. The conductive resistance sheet may be preferably made of a material that is easily deformed by the vacuum pressure and has the lowest stiffness.

Even when the porous substance 33 is filled in the vacuum space part 50, the conductive resistance sheet may prefer-ably have the lowest stiffness, and the plate member and the side frame may preferably have the highest stiffness.

Figure 5:
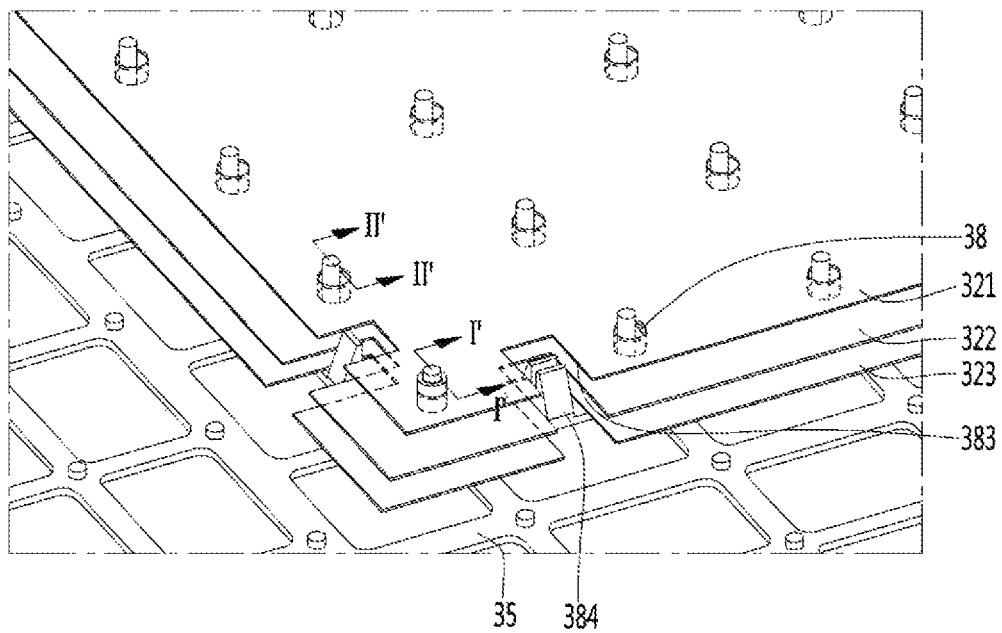
FIG. 5 is a view illustrating a state in which a radiation resistance sheet is coupled to a support unit.

FIG. 5 is a view illustrating a state in which a radiation resistance sheet is coupled to a support unit.

Referring to FIG. 5, a radiation resistance sheet 32 is located inside the vacuum space part 50 by fitting a bar 31 into a hole 38 defined in the radiation resistance sheet 32. The hole 38 and the bar 31 may be spaced a predetermined distance from each other. The bar 31 may perform a fixing function of the radiation resistance sheet 32 and maintain the distance with the vacuum space part 50. That is to say, when the bar 31 extends to maintain the distance between the plate members, the bar passes through the radiation resistance sheet 32. Here, the hole 38 for preventing an interference with the radiation resistance sheet 32 has to be provided. Here, the bar 31 may be provided to be integrated with the support plate 35.

Also, to perform sufficient radiation resistance action, at least two radiation resistance sheets, preferably, three or more radiation resistance sheets 32 may be provided. To sufficiently realize the radiation resistance effect by using the plurality of radiation resistance sheets 321, 322, and 333, the inside of the vacuum space part 50 may be equally divided, and the plurality of radiation resistance sheets may be respectively disposed in the divided spaces. That is, a distance between the radiation resistance sheets may be sufficiently maintained to be spaced apart from each other. For this, a spacing block 36 for spacing the plate members 10 and 20 from the radiation resistance sheets and spacing the radiation resistance sheets from each other may be provided.

A seating rib 384 may be provided to temporarily couple the support plates to each other or coupling the supporting unit to the first plate member 10. Also, an insertion groove 383 is defined in an edge of the radiation resistance sheet 32 to prevent the seating rib 384 from interfering with the radiation resistance sheet 32. Since the seating rib 384 is inserted through the insertion groove 383, the radiation resistance sheet 32 may be expanded outward and more stably resist radiation heat transfer.

Figure 6:
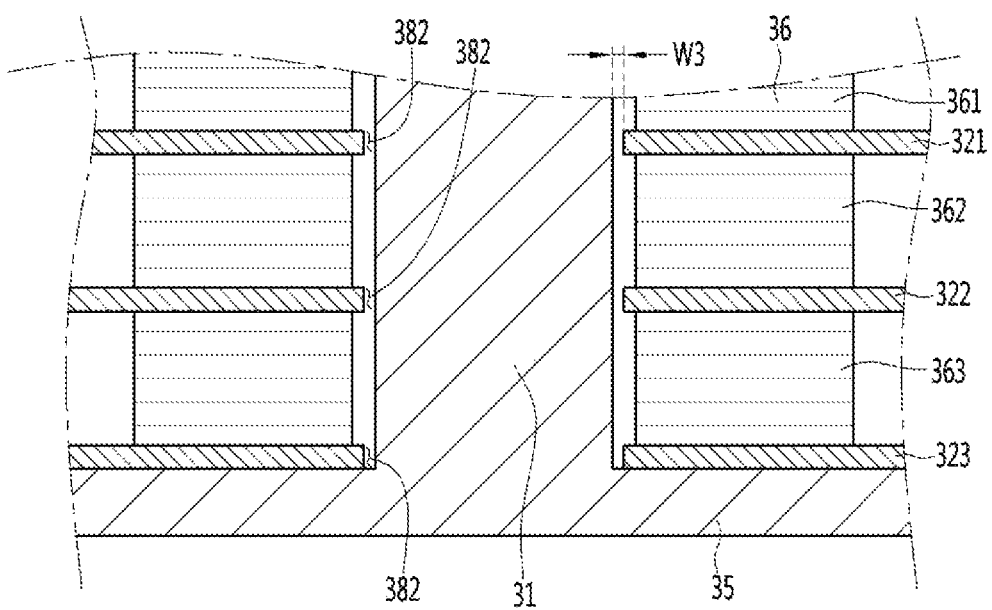
FIG. 6 is a cross-sectional view taken along line I-I' of FIG. 5.
Figure 7:
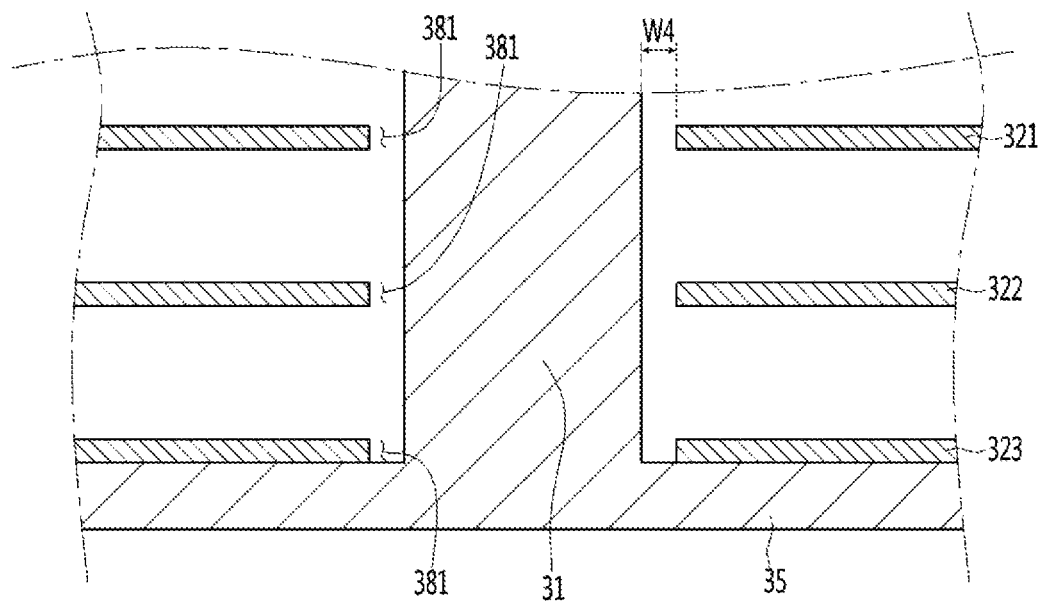
FIG. 7 is a cross-sectional view taken along line II-II' of FIG. 5.

FIG. 6 is a cross-sectional view taken along line I-I' of FIG. 5, and FIG. 7 is a cross-sectional view taken along line II-II' of FIG. 5. Here, FIG. 6 is a cross-sectional view of a first hole 382 through which the bar 31 passes to support the radiation resistance sheet 32 and a peripheral portion thereof, and FIG. 7 is a cross-sectional view of a second hole 381 through which the bar 31 passes without supporting the radiation resistance sheet 32 and a peripheral portion thereof.

Referring to FIG. 6, the radiation resistance sheets 321, 322, and 333 in which the first hole 382 is defined and the bar 31 passing through the first hole 382 are illustrated. Also, the spacing blocks 361, 362, and 363 may be provided to maintain the distance between the radiation resistance sheets and the distance between the radiation resistance sheet and the support plate 35. The first hole 382 may have a diameter so that only a predetermined assembly tolerance is included in a diameter of the bar 31 to guide a position of the radiation resistance sheet with respect to the bar 31. If the first hole 382 has a too small diameter, it may be difficult to fit the radiation resistance sheet 32 into the bar 31, and thus, the thin radiation resistance sheet 32 may be damaged during the process. Thus, the diameter of the first hole 382 has to be provided to further reflect a length of the assembly tolerance. On the other hand, if the first hole 382 has a too large diameter, vibration may occur even though the radiation resistance sheet 32 is supported by the bar 31, and thus, the radiation resistance sheet 32 may be deformed. Thus, the diameter of the first hole 382 has to be provided to further reflect a length of only the assembly tolerance. In this situation, the inventor has found that it is desirable to provide the assembly tolerance in a range of about 0.1 mm to about 0.5 mm. In FIG. 6, the sum of W3 on both sides of the bar is considered as an assembly tolerance.

When the first hole 382 is defined, it is preferable that no portion of the radiation resistance sheet 32 comes into contact with the bar 31. This is because when the radiation resistance sheet 32 comes into contact with the bar, heat conduction may be generated to deteriorate an adiabatic effect. It may be desirable to support the plurality of first holes 382 at as few positions as possible due to the interaction of the plurality of first holes 382.

Referring to FIG. 7, the radiation resistance sheets 321, 322, and 333 in which the second hole 381 is defined and the bar 31 passing through the second hole 381 are illustrated.

Figure 8:
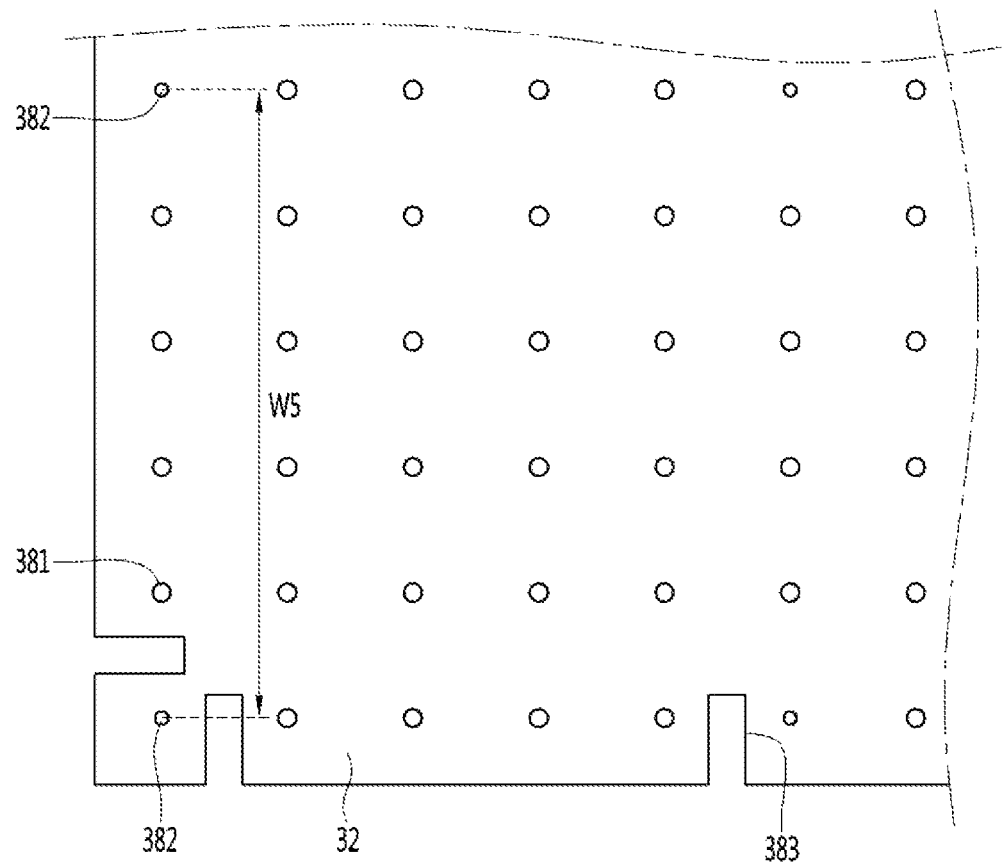
FIG. 8 is a plan view illustrating one apex portion of the radiation resistance sheet.

When the second hole 381 has a too large diameter, the radiation resistance sheet 32 may comes into contact with the bar 31 to cause an adiabatic loss. If the second hole 381 has a too large diameter, radiation heat loss may occur through the spacing part between the bar 31 and the second hole 381. In this situation, the inventor has found that the sum of both spaces between the second hole 381 and the bar 31 is provided in range of about 0.3 mm to about 1.5 mm. In FIG. 8, a value of the sum of W4 on both sides of the bar corresponds thereto.

A bar inserted into the first hole 382 to support a horizontal movement of the radiation resistance sheet may be referred to as a first bar, and a bar inserted into the second hole 381 without supporting the horizontal movement of the radiation resistance sheet may be referred to as a second bar.

The spacing block 36 may is greater than any of the holes 381 and 382 so that the spacing block 36 does not interfere with the space maintenance of the radiation resistance sheet 32.

FIG. 8 is a plan view illustrating one apex portion of the radiation resistance sheet.

Referring to FIG. 8, the first hole 382 having a small diameter and the second hole 381 having a diameter greater than that of the first hole 382 are processed in the radiation resistance sheet 32. There has been described the passing function of the bar 31 through the holes 381 and 382 and the supporting function of the radiation resistance sheet 32.

The first holes 382 may be provided as closely as possible to prevent the radiation resistance sheet 32 from being shaken. However, since the more the number of first holes 382 increases, the more contact portions or approaching portions between the radiation resistance sheet 32 and the bar 31 increase, the adiabatic performance may be deteriorated. Considering the above-described two conditions, it is preferable that the distance between the first holes 382 does not exceed a maximum of 200 mm when the radiation resistance sheet is an aluminum foil having a thickness of about 0.3 mm. In the case in which a cross-section of the door 3 is provided with a curved line, since the radiation resistance sheet is also provided as a curved surface, the distance between the first holes 382 may need to be further maintained so as to avoid the contact between the radiation resistance sheets.

According to this background, it is preferable that W5 indicated by the distance between the first holes 382 does not exceed a maximum of about 200 mm. Also, it is preferable that the first hole 382 is provided at the outermost portion, i.e., a vertex portion with respect to a center of the radiation resistance sheet 32. This is for the purpose of preventing deterioration of the adiabatic performance due to the contact between the radiation resistance sheet 32 and the bar 31 and the purpose of allowing the radiation resistance sheet 32 to extend as much as possible to prevent deterioration of the heat insulating performance. Also, three second holes 381 may be defined between a pair of first holes 382 that are directly adjacent to each other. Also, to prevent the adiabatic performance from being deteriorated, in any one radiation resistance sheet, the number of first holes 382 may be less than that of second holes 381.

Since the radiation resistance sheet 32 is provided as the foil, the radiation resistance sheet 32 may be deformed by an external impact. When the radiation resistance sheet 32 is deformed to come into contact with other parts within the vacuum space part 50, heat conduction performance may increase to deteriorate the adiabatic performance of the vacuum adiabatic body. In addition, the contact 32 between the radiation resistance sheets promotes the heat conduction between the sheets and does not resist the radiation heat transfer of the radiation resistance sheet.

An inner area of a two-dimensional entire area of the radiation resistance sheet 32 may stop the horizontal movement by the mutual support action of the bar 31 and the first hole 382, and the vertical movement may be stopped by mutual support between the radiation resistance sheets 32 by the spacing blocks 361, 362, and 363.

An outer area, that is, an edge area, of an entire two-dimensional area of the radiation resistance sheet 32 may be an area that is not supported by the bar 31, the first hole 382, and the spacing blocks 361, 362, and 363, and thus, the area may freely move. The edge area may define a position where the first hole 382 and the spacing blocks 361, 362, and 363 are formed horizontally and outwardly. Alternatively, since the first hole and the spacing block have a certain level of an error, it is not possible to strictly define the edge area, but it may be interpreted within a range of engineering error.

Since the edge area exists, that the outer area of the radiation resistance sheet 32 is prevented from coming into contact with other parts of the vacuum space portion 50 and that the outer area of the radiation resistance sheet 32 does not come into contact with the radiation resistance sheet 32 may act as a major one factor in improving the adiabatic performance of the vacuum adiabatic body.

The supporting unit 30 may be applied to both the door 3 and a main body 2. In the supporting unit 30 inserted into the vacuum space part 50 of the main body 2, the supporting units inserted into different planes may come into contact with each other unlike the supporting unit 30 inserted into the door 3. In this case, the supporting units 30 may come into contact with each other, and when the supporting units 30 comes into contact with each other, the tendency of heat conduction may more increase and act as a larger factor that deteriorates the heat conduction resistance performance of the vacuum adiabatic body.

Hereinafter, the outer area of the radiation resistance sheet 32 will be described in more detail. Particularly, the supporting unit 30 applied to the main body 2 will be described as an example, but it is not excluded that the idea is applied to the door 3.

First, since the radiation resistance sheet 32 has the edge area, and the edge area is not supported, the radiation resistance sheet 32 may be freely deformed by the external impact. The deformation may be limited by strength of the radiation resistance sheet 32, but it is vulnerable to deformation because it is processed to a considerably thin shape.

A process in which the supporting unit is inserted into the vacuum insertion part 50 will be described.

FIGS. 9 to 12 are schematic cross-sectional views of the vacuum adiabatic body into which the supporting unit is inserted.

Figure 9:
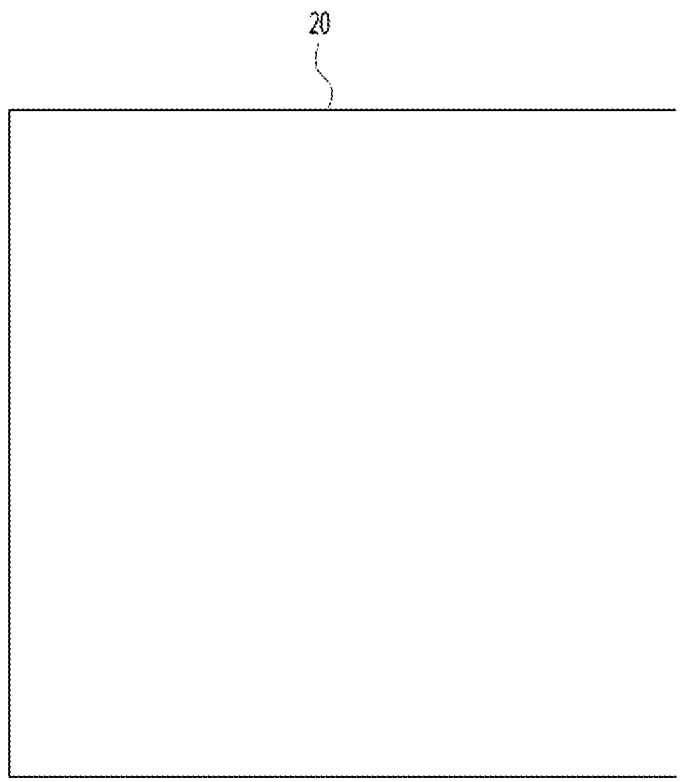
FIGS. 9 to 12 are schematic cross-sectional views of a vacuum adiabatic body into which the supporting unit is inserted.

As illustrated in FIG. 9, the second plate member 20 is prepared. The second plate member 20 may provide a wall of a second space that is an external space, i.e., a room-temperature space.

Figure 10:
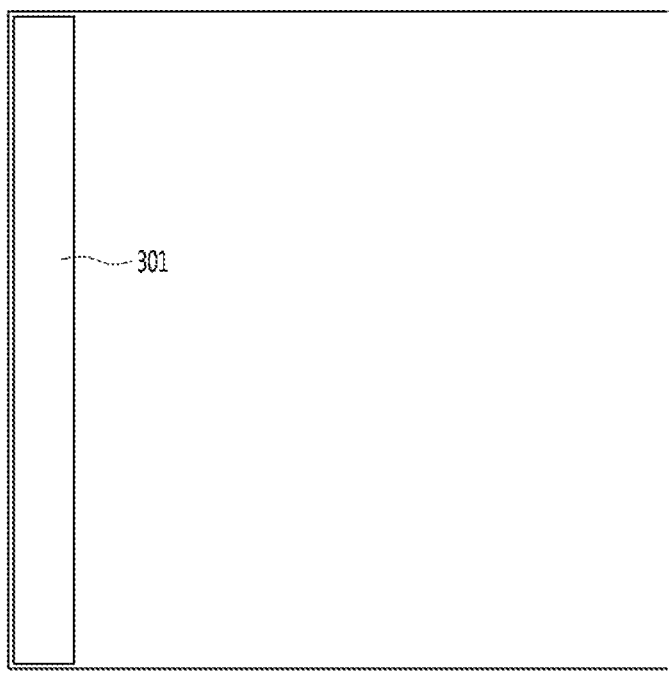

Thereafter, as illustrated in FIG. 10, any one supporting unit 30 is inserted into a bottom surface of the second plate member 20. The support unit 30 may be exemplified to include the support plates 35 and 36, the bar 31, and a structure supporting a position of the radiation resistance sheet 32.

Figure 11:
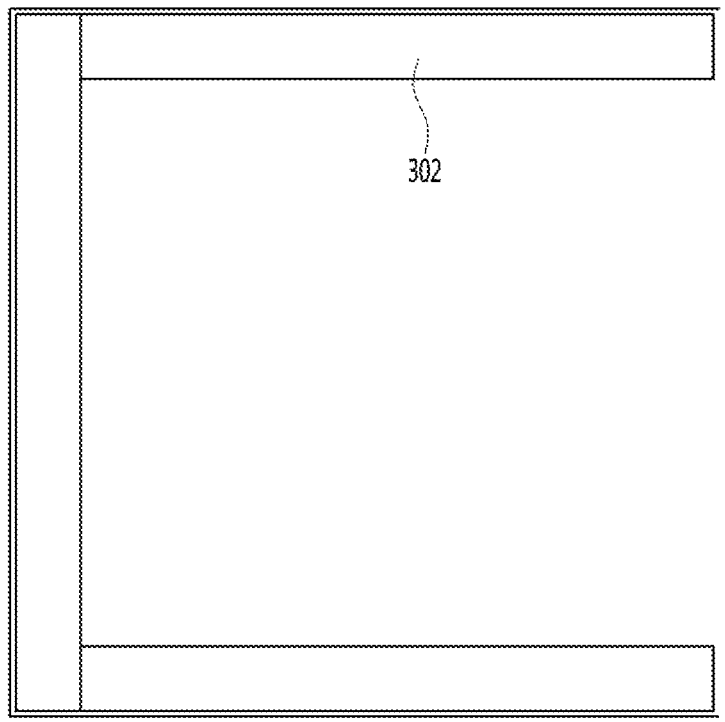

Thereafter, as illustrated in FIG. 11, the supporting unit 30 is inserted into an inner sidewall of the second plate member 20. An end of the supporting unit 30 disposed on one outer surface of the support plates 35 and 36 is disposed on the supporting unit 30 disposed on the bottom surface. That is, the support unit 30 disposed on the side surface is placed on the supporting unit 30 disposed on the bottom surface.

Figure 12:
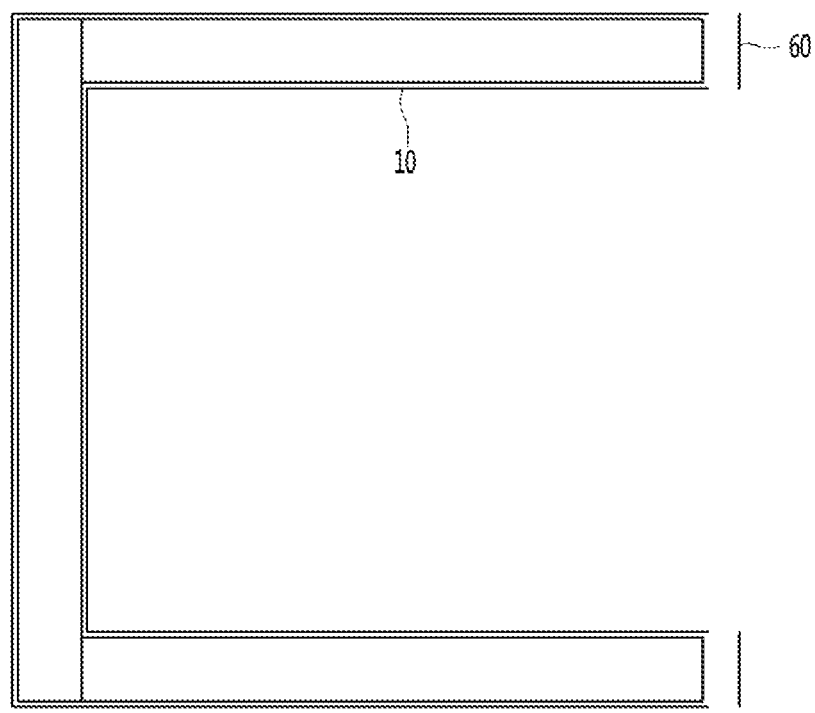

Thereafter, as illustrated in FIG. 12, the first plate member 10 is inserted. Before the first plate member 10 is inserted, the supporting unit 30 may be temporally assembled. When the first plate member 10 is inserted, the whole structure including the supporting unit 30 may be stable in position. Then, the vacuum space part 50 is sealed by the conductive resistance sheet 60.

Thereafter, an action of exhaust and gettering (or depressurization) may be further performed.

Figure 13:
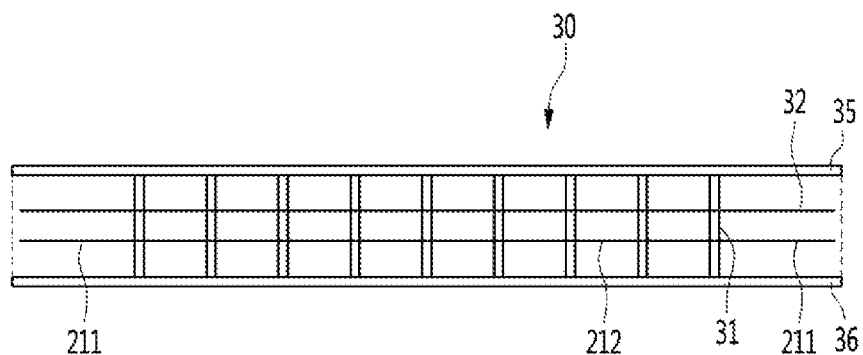
FIG. 13 is schematic cross-sectional view of the supporting unit.

FIG. 13 is schematic cross-sectional view of the supporting unit.

Referring to FIG. 13, according to this embodiment, the support plates 35 and 36 may further extend to the outside of the edge area of the radiation resistance sheet 32. That is, the edge area of the radiation resistance sheet 32 may be disposed inside an edge of each of the support plates 35 and 36. When viewed in a cross-section, an edge of the radiation resistance sheet 32 may be disposed inside a virtual line (a dotted line in FIG. 13) connecting the edges of the pair of radiation resistance sheets 32 to each other.

According to the above-described constituents, the radiation resistance sheet 32 may not come into contact with other parts within the vacuum space part 50. The radiation resistance sheet 32 may not come into contact with the other support unit 30 that is adjacent thereto. Thus, the adiabatic performance of the vacuum adiabatic body may be improved, and the deterioration in adiabatic performance due to use for a long time may be prevented.

A process in which the supporting unit is inserted into the vacuum insertion part according to another embodiment will be described.

Figure 16:
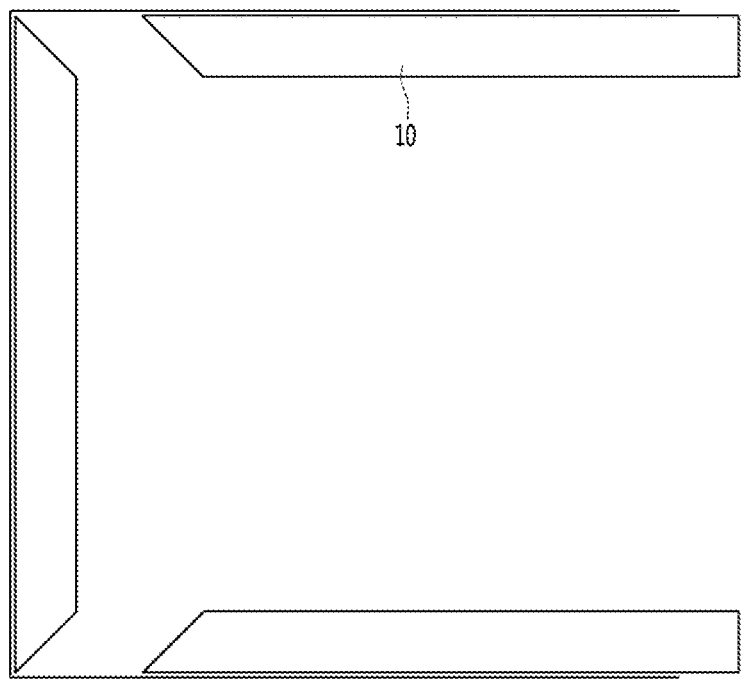
Figure 17:
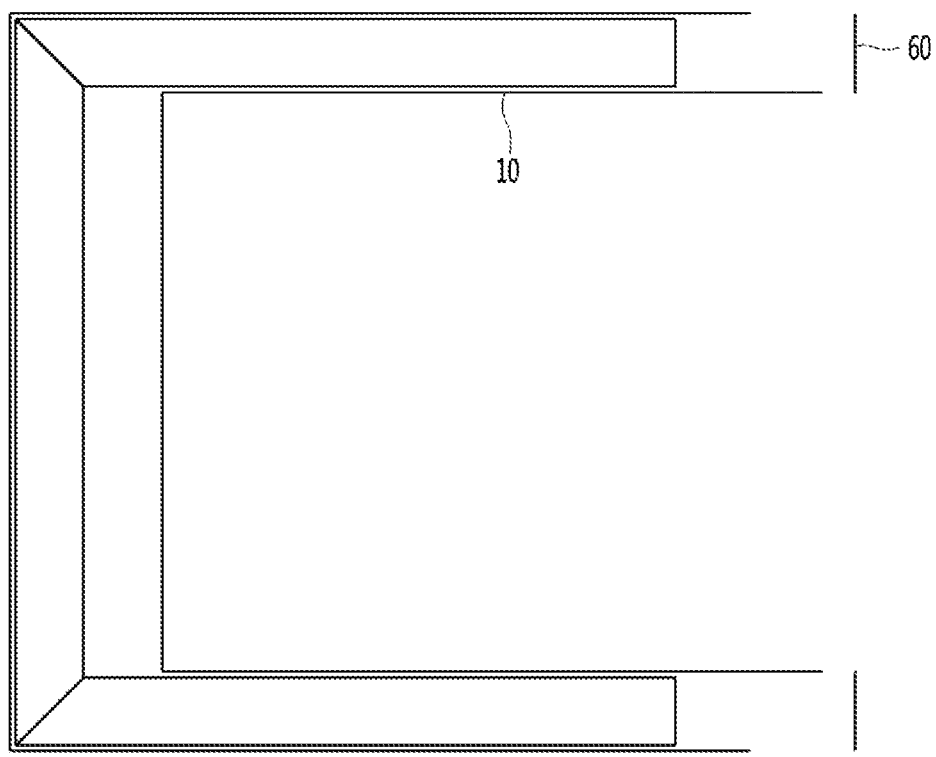
Figure 18:
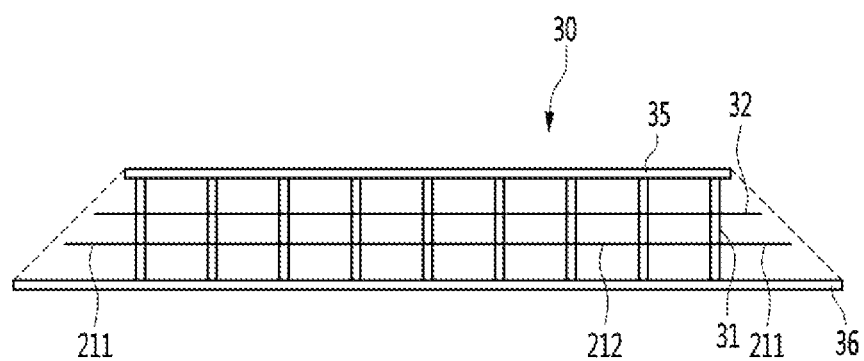
FIG. 18 is schematic cross-sectional view of the supporting unit according to another embodiment.

FIGS. 14 to 17 are schematic cross-sectional views of a vacuum adiabatic body into which a supporting unit is inserted according to another embodiment, and FIG. 18 is schematic cross-sectional view of the supporting unit according to another embodiment.

Referring to FIG. 18, support plates 35 and 36 are divided into two parts different from each other. For example, the support plates 35 and 36 may be divided into a first support plate 35 disposed inside a main body and a second support plate 36 disposed outside the main body 2. In other aspect, the support plates 35 and 36 may be divided into a second support plate 36 coming into contact with a vacuum adiabatic body and a first support plate 35 that does not come into contact with the vacuum adiabatic body.

In this case, an edge of a radiation resistance sheet 32 may be positioned inside a virtual line connecting the edges of the first and second support plates 35 and 36. Thus, the radiation resistance sheet 32 may not come into contact with the other support unit 30 that is adjacent thereto. Thus, the adiabatic performance of the vacuum adiabatic body may be improved, and the deterioration in adiabatic performance due to use for a long time may be prevented.

The first support plate 35 may have a size less than that of the second support plate 36. When the main body 2 is provided, the use of other types of supporting units 30 may lead to an increase in inventory ratio and complicated process problems. To solve these problems, it is possible to process the supporting unit 30 in the same shape, in particular, the parts coming into contact with the supporting units 30 in the same shape so that the parts coming into contact with each other may be aligned with each. For this, the virtual line connecting the edges of the first and second support plates 35 and 36 to each other may be provided at an angle of about 45 degrees with respect to a vertical line connecting the support plates 35 and 36 to each other.

Figure 14:
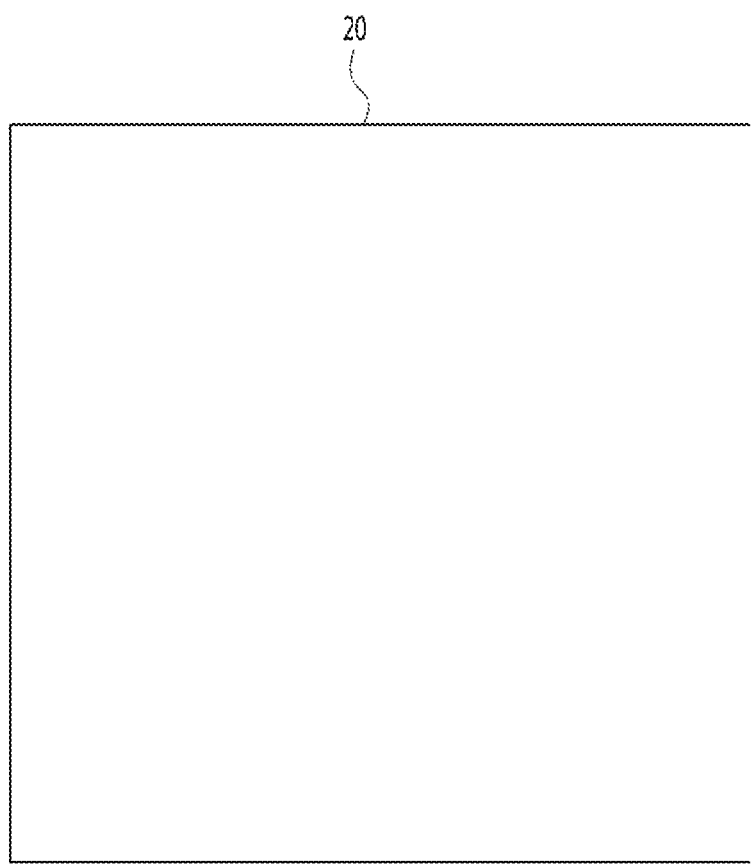
FIGS. 14 to 17 are schematic cross-sectional views of a vacuum adiabatic body into which a supporting unit is inserted according to another embodiment.

When the mounting of the support unit is successively described, as illustrated in FIG. 14, the second plate member 20 is prepared. The second plate member 20 may provide a wall of a second space that is an external space.

Figure 15:
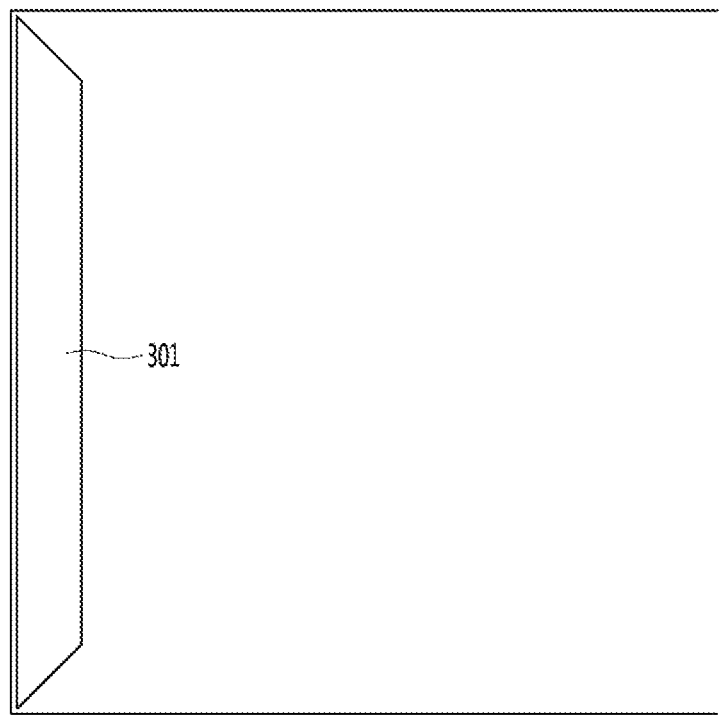

Thereafter, as illustrated in FIG. 15, any one supporting unit 30 is inserted into a bottom surface of the second plate member 20. The supporting unit 30 may come into contact with the second support plate 36, and the first support plate 35 may be directed to the inside of the main body. Alternatively, the support unit 30 may include the radiation resistance sheet 32, the bar 31, and a structure supporting a position of the radiation resistance sheet 32.

Thereafter, as illustrated in FIG. 16, the supporting unit 30 is inserted into an inner sidewall of the second plate member 20. When all the supporting units 30 are inserted, the support unit 30 disposed on the bottom surface and the supporting unit 30 disposed on the side surface may come into contact with each other. Here, the supporting units 30 coming into contact with each other may be configured so that the support plates 35 come into contact with each other, and the radiation resistance sheets 32 do not come into contact with each other. Thus, the adiabatic performance may be improved.

Thereafter, as illustrated in FIG. 17, the first plate member 10 is inserted. Before the first plate member 10 is inserted, the supporting unit 30 may be temporally assembled. When the first plate member 10 is inserted, the whole structure including the supporting unit 30 may be stable in position. Then, the vacuum space part 50 is sealed by the conductive resistance sheet 60.

Thereafter, an action of exhaust and gettering may be further performed.

Figure 19:
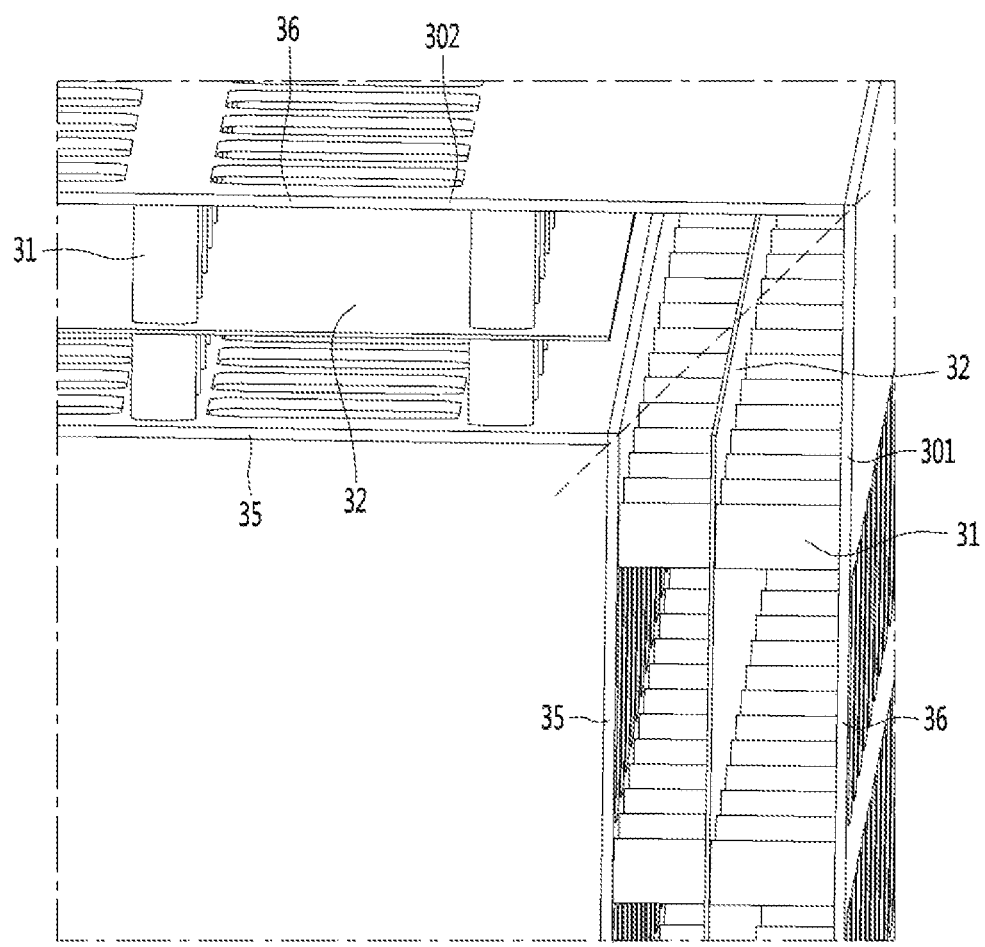
FIG. 19 is an enlarged perspective view illustrating a contact part of the supporting unit.

FIG. 19 is an enlarged perspective view illustrating a contact part of the supporting unit.

Referring to FIG. 19, in the drawing, a vertical supporting unit is a member that is placed on a bottom wall of the main body 2, and a horizontal supporting unit is a member placed on a sidewall of the main body 2. When observing edge parts of the support plates 35 and 36, it is seen that an end of the supporting unit disposed on the side surface is placed on the supporting unit disposed on the bottom surface.

In detail, an end of the second support plate 302 of the supporting unit disposed on the side surface may be placed on the second support plate 301 of the supporting unit disposed on the bottom surface. According to the above-described constituents, the supporting unit 30 on the bottom surface may cover the bottom surface of the second plate member 20 as a whole, so that the assembly is convenient.

Here, a space therebetween allows for engineering assembly tolerances for insertion, but may not allow other members to be inserted therebetween. That is, an edge of the second support plate 301 of the supporting unit 30 on the bottom surface may be manufactured through the same process as an inner area of the second plate member 20.

In this case, it is seen that an edge of the radiation resistance sheet 32 is disposed inside a virtual line (see a dotted line) connecting edges of the first and second support plates 35 and 36 to each other in each of the supporting units 30. Thus, it is possible to prevent the problem that the radiation resistance sheet comes into contact with the radiation resistance sheet 32 of another adjoining supporting unit at the time of installing the supporting unit 30. Furthermore, even when the radiation resistance sheet 32 is curved to a certain degree due to an external impact, there is no problem of coming into contact with other products in the vacuum space part 50, thereby improving the heat adiabatic performance of the vacuum adiabatic body.

When a strong impact is applied to the radiation resistance sheet 32, the radiation resistance sheet 32 may be bent to a considerable level, for example, a level exceeding about 40 degrees. Such a problem may occur if the foil is provided in an extremely thin plate shape.

A description will be given of the position at which a bent angle of the radiation resistance sheet 32 may occur at a considerable level or more, for example, the edge part of the radiation resistance sheet 32 usable in the vehicle or the portable refrigerator.

Figure 20:
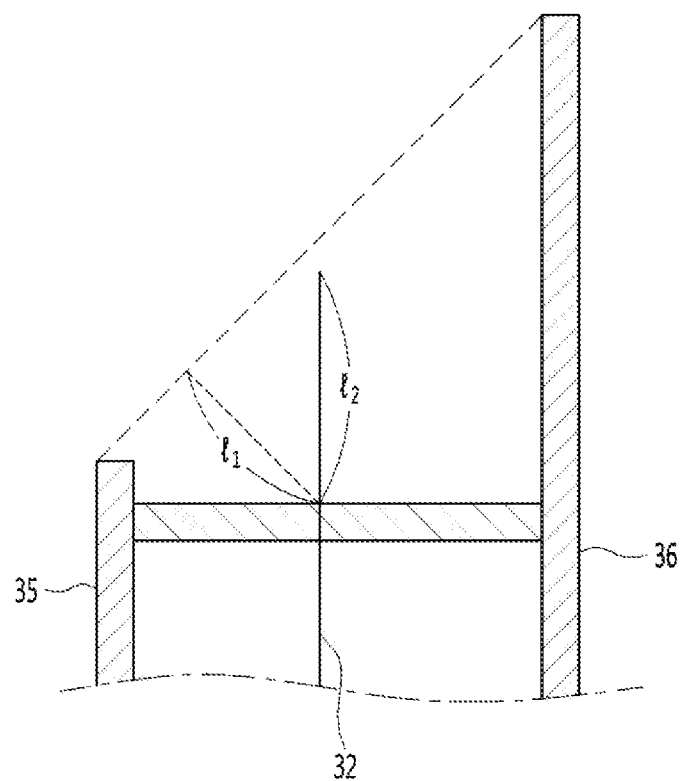
FIG. 20 is a schematic view illustrating an edge part of the supporting unit.

FIG. 20 is a schematic view illustrating an edge part of the supporting unit.

Referring to FIG. 20, the supporting unit include the first support plate 35, the second support plate 36, the bar 31 supporting the spacing part between the support plates 35 and 36, and the radiation resistance sheet 32 fixed to the bar 31.

The radiation resistance sheet 32 may be supported in position by using the bar 31 as a supporting point, and the outside of the radiation resistance sheet 32 may be bent or deformed by an external impact as an edge area.

In order to prevent such bending and deformation from affecting the deterioration of the adiabatic performance, which is caused by the radiation resistance sheet 32, a distance I2 from the supporting point to the edge of the radiation resistance sheet 32 is provided to be shorter than a distance I1 to the virtual line connecting the edges of the first and second support plates 35 and 36 to each other at the supporting point. Thus, the radiation resistance sheets of the different supporting units 30 adjacent to each other may not come into contact with each other. The distance I2 from the supporting point to the edge of the radiation resistance sheet 32 may range from about 10 mm to about 15 mm.

When an end of the supporting unit 30 is provided to be vertically inclined, a process in which the supporting unit is inserted into the vacuum insertion part 50 according to another embodiment will be described.

FIGS. 21 to 24 are schematic cross-sectional views of a vacuum adiabatic body into which a supporting unit is inserted according to another embodiment.

Figure 21:
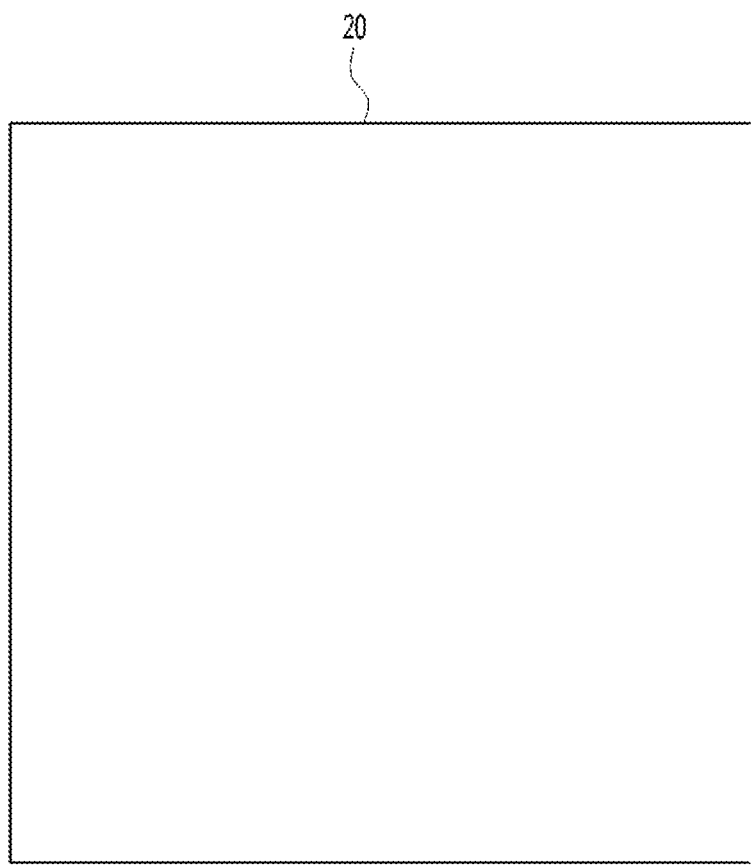
FIGS. 21 to 24 are schematic cross-sectional views of a vacuum adiabatic body into which a supporting unit is inserted according to further another embodiment.

As illustrated in FIG. 21, a second plate member 20 is prepared. The second plate member 20 may provide a wall of a second space that is an external space.

Figure 22:
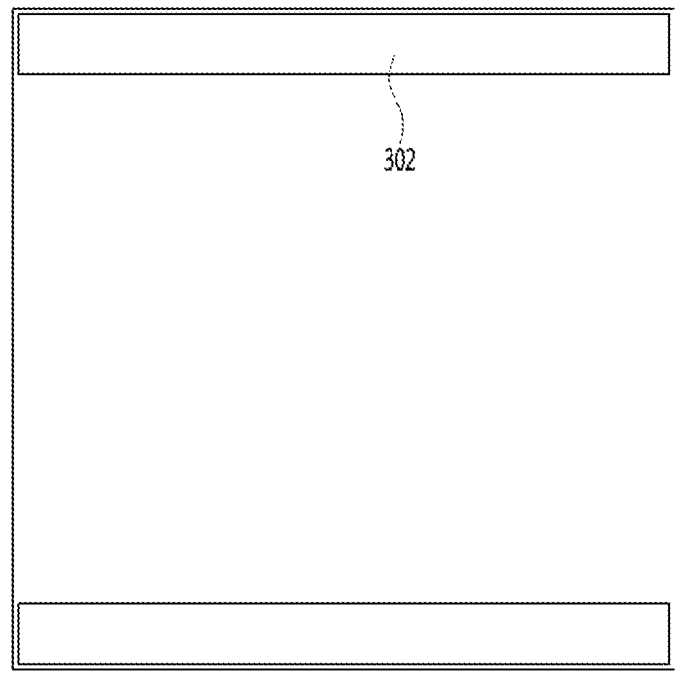

Thereafter, as illustrated in FIG. 22, a supporting unit 30 is inserted into a side surface of the second plate member 20. The support unit 300 may be exemplified to include support plates 35 and 36, radiation resistance sheet 32, a bar 31, and a structure supporting a position of the radiation resistance sheet 32. The supporting unit 30 disposed on the side surface may be supported in position by a predetermined jig.

Figure 23:
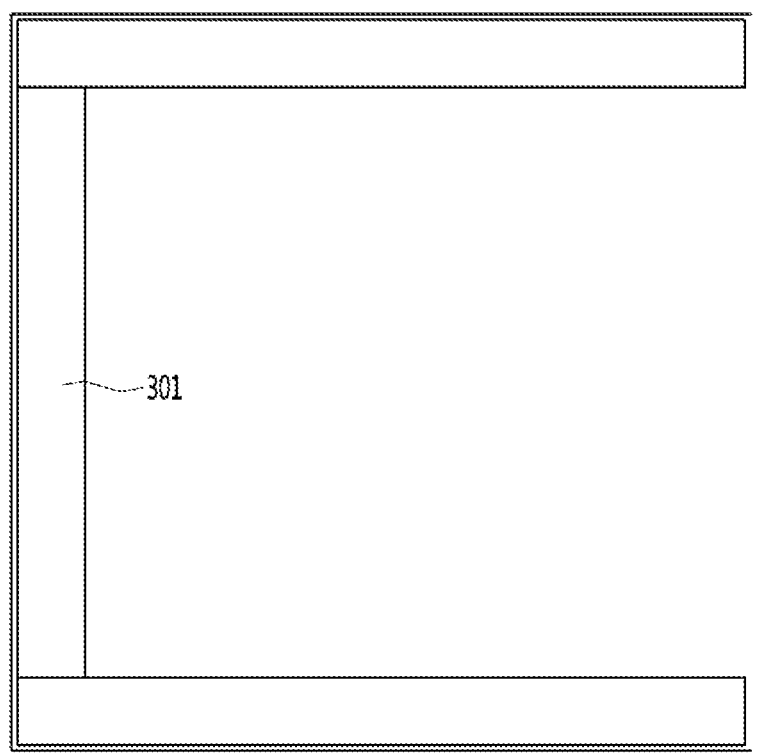

Thereafter, as illustrated in FIG. 23, the supporting unit 30 is inserted into a bottom surface of the second plate member 20. An end of the supporting unit 30 disposed on the bottom surface of one outer surface of the support plates 35 and 36 is disposed on the supporting unit 30 disposed on the side surface. That is, the support unit 30 disposed on the bottom surface is placed on the supporting unit 30 disposed on the side surface.

Figure 24:
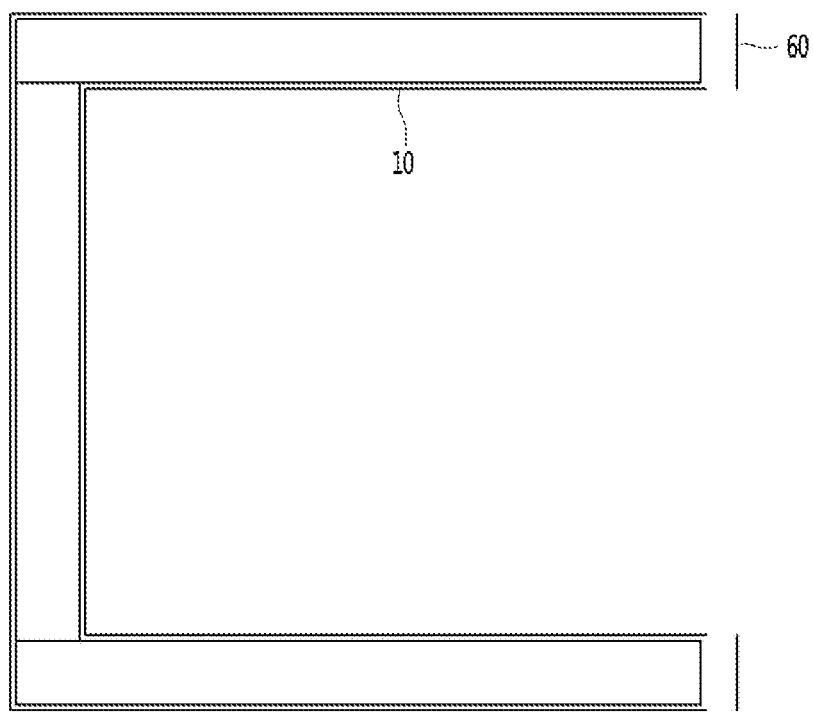

Thereafter, as illustrated in FIG. 24, the first plate member 10 is inserted. Before the first plate member 10 is inserted, the supporting units 30 may be temporally assembled. When the first plate member 10 is inserted, the whole structure including the supporting unit 30 may be stable in position. Then, the vacuum space part 50 is sealed by the conductive resistance sheet 60.

Thereafter, an action of exhaust and gettering may be further performed.

Even in this case, the supporting unit 30 may have the same structure and shape as that of FIG. 13 except for a size of the supporting unit 30.

Hereinafter, a vacuum pressure preferably determined depending on an internal state of the vacuum adiabatic body. As already described above, a vacuum pressure is to be maintained inside the vacuum adiabatic body so as to reduce heat transfer. At this time, it will be easily expected that the vacuum pressure is preferably maintained as low as possible so as to reduce the heat transfer.

The vacuum space part may resist the heat transfer by applying only the supporting unit 30. Alternatively, the porous substance 33 may be filled together with the supporting unit in the vacuum space part 50 to resist the heat transfer. Alternatively, the vacuum space part may resist the heat transfer not by applying the supporting unit but by applying the porous substance 33.

The case where only the supporting unit is applied will be described.

Figure 25:
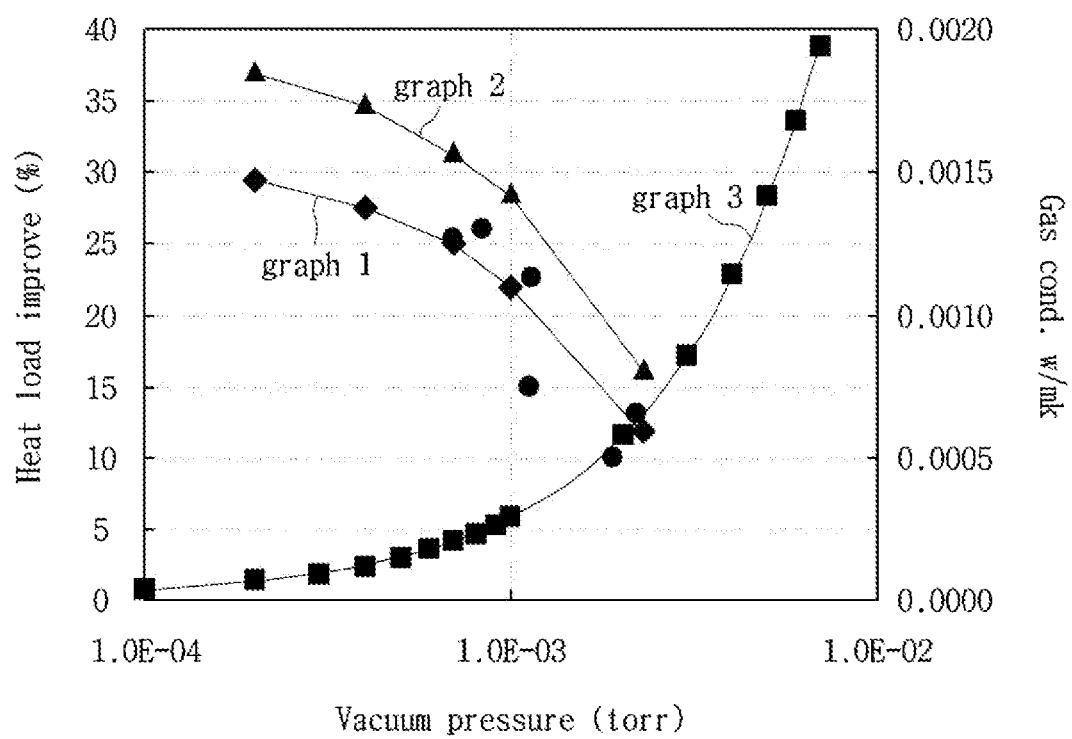
FIG. 25 is a graph illustrating a variation in adiabatic performance and a variation in gas conductivity according to a vacuum pressure by applying a simulation.

FIG. 25 illustrates graphs showing changes in adiabatic performance and changes in gas conductivity with respect to vacuum pressures by applying a simulation.

Referring to FIG. 25, it may be seen that, as the vacuum pressure is decreased, i.e., as the vacuum degree is increased, a heat load in the case of only the main body (Graph 1) or in the case where the main body and the door are joined together (Graph 2) is decreased as compared with that in the case of the typical product formed by foaming polyurethane, thereby improving the adiabatic performance. However, it may be seen that the degree of improvement of the adiabatic performance is gradually lowered. Also, it may be seen that, as the vacuum pressure is decreased, the gas conductivity (Graph 3) is decreased. However, it may be seen that, although the vacuum pressure is decreased, the ratio at which the adiabatic performance and the gas conductivity are improved is gradually lowered. Therefore, it is preferable that the vacuum pressure is decreased as low as possible. However, it takes a long time to obtain excessive vacuum pressure, and much cost is consumed due to excessive use of a getter. In the embodiment, an optimal vacuum pressure is proposed from the above-described point of view.

Figure 26:
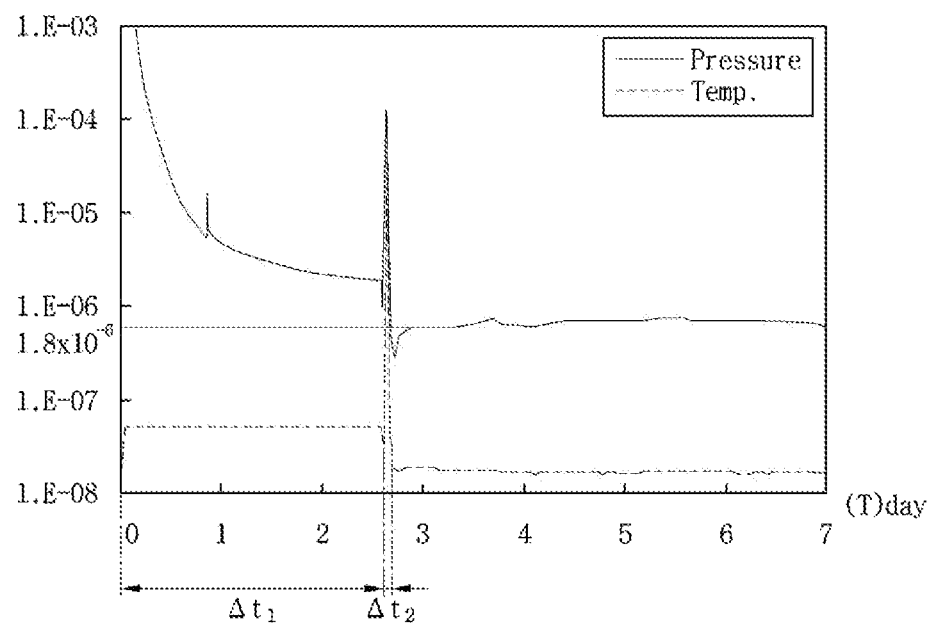
FIG. 26 is a graph illustrating results obtained by observing a time and a pressure in a process of exhausting the inside of the vacuum adiabatic body when a supporting unit is used.

FIG. 26 illustrates graphs obtained by observing, over time and pressure, a process of exhausting the interior of the vacuum adiabatic body when the supporting unit is used.

Referring to FIG. 26, in order to create the vacuum space part 50 to be in the vacuum state, a gas in the vacuum space part 50 is exhausted by a vacuum pump while evaporating a latent gas remaining in the parts of the vacuum space part

50 through baking. However, if the vacuum pressure reaches a certain level or more, there exists a point at which the level of the vacuum pressure is not increased any more (Δt1). After that, the getter is activated by disconnecting the vacuum space part 50 from the vacuum pump and applying heat to the vacuum space part 50 (Δt2). If the getter is activated, the pressure in the vacuum space part 50 is decreased for a certain period of time, but then normalized to maintain a vacuum pressure of a certain level. The vacuum pressure that maintains the certain level after the activation of the getter is approximately $1.8 \times 10^{-6}$ Torr.

In the embodiment, a point at which the vacuum pressure is not substantially decreased any more even though the gas is exhausted by operating the vacuum pump is set to the lowest limit of the vacuum pressure used in the vacuum adiabatic body, thereby setting the minimum internal pressure of the vacuum space part 50 to $1.8 \times 10^{-6}$ Torr.

Figure 27:
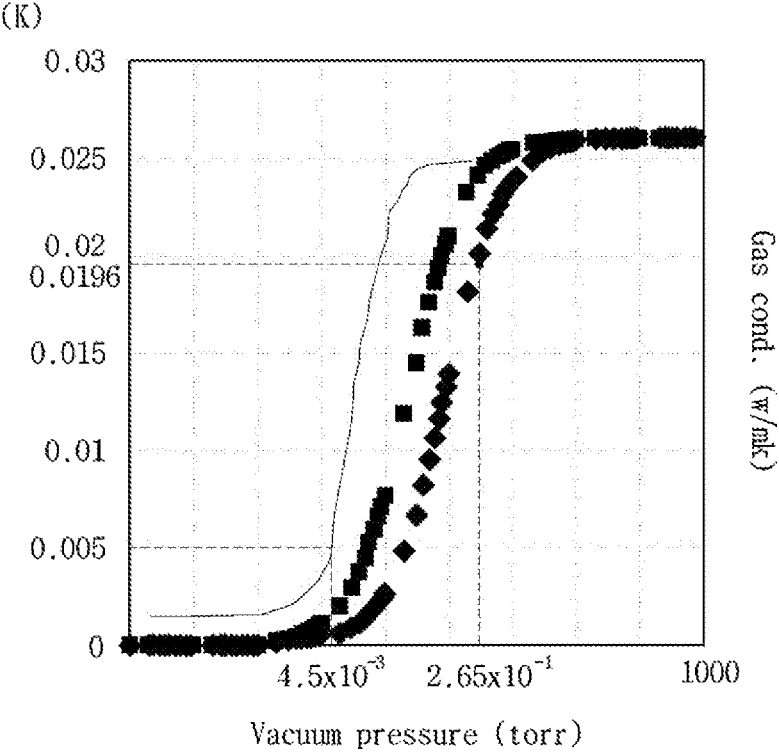
FIG. 27 is a graph illustrating results obtained by comparing a vacuum pressure with gas conductivity.

FIG. 27 illustrates graphs obtained by comparing vacuum pressures and gas conductivities.

Referring to FIG. 27, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside vacuum space part 50, the gap is a distance between the radiation resistance sheet 32 and the plate member adjacent thereto. When the radiation resistance sheet 32 does not exist inside vacuum space part 50, the gap is a distance between the first and second plate members.

It may be seen that, since the size of the gap is small at a point corresponding to a typical effective heat transfer coefficient of 0.0196 W/mK, which is provided to a adiabatic material formed by foaming polyurethane, the vacuum pressure is $2.65 \times 10^{-1}$ Torr even when the size of the gap is 2.76 mm. Meanwhile, it may be seen that the point at which reduction in adiabatic effect caused by gas conduction heat is saturated even though the vacuum pressure is decreased is a point at which the vacuum pressure is approximately $4.5 \times 10^{-3}$ Torr. The vacuum pressure of $4.5 \times 10^{-3}$ Torr may be defined as the point at which the reduction in adiabatic effect caused by gas conduction heat is saturated. Also, when the effective heat transfer coefficient is 0.1 W/mK, the vacuum pressure is $1.2 \times 10^{-2}$ Torr.

When the vacuum space part 50 is not provided with the supporting unit but provided with the porous substance, the size of the gap ranges from a few micrometers to a few hundreds of micrometers. In this case, the amount of radiation heat transfer is small due to the porous substance even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10^{-4}$ Torr. Also, the vacuum pressure at the point at which the reduction in adiabatic effect caused by gas conduction heat is saturated is approximately $4.7 \times 10^{-2}$ Torr. Also, the pressure where the reduction in adiabatic effect caused by gas conduction heat reaches the typical effective heat transfer coefficient of 0.0196 W/mK is 730 Torr.

When the supporting unit and the porous substance are provided together in the vacuum space part, a vacuum pressure may be created and used, which is middle between the vacuum pressure when only the supporting unit is used and the vacuum pressure when only the porous substance is used.

In the description of the present disclosure, a part for performing the same action in each embodiment of the vacuum adiabatic body may be applied to another embodiment by properly changing the shape or dimension of another embodiment. Accordingly, still another embodiment may be easily proposed. For example, in the detailed description, in the case of a vacuum adiabatic body suitable as a door-side vacuum adiabatic body, the vacuum adiabatic body may be applied as a main body-side vacuum adiabatic body by properly changing the shape and configuration of a vacuum adiabatic body.

The vacuum adiabatic body proposed in the present disclosure may be preferably applied to refrigerators. However, the application of the vacuum adiabatic body is not limited to the refrigerators, and may be applied in various apparatuses such as cryogenic refrigerating apparatuses, heating apparatuses, and ventilation apparatuses.

INDUSTRIAL APPLICABILITY

According to the present disclosure, the vacuum adiabatic body may be industrially applied to various adiabatic apparatuses. The adiabatic effect may be enhanced, so that it is possible to improve energy use efficiency and to increase the effective volume of an apparatus.

The invention claimed is:

1. A vacuum adiabatic body comprising:
 a first plate that defines at least a portion of a first side of a wall adjacent to a first space having a first temperature;
 a second plate that defines at least a portion of a second side of the wall adjacent to a second space having a second temperature different from the first temperature;
 a seal that seals the first plate and the second plate to provide a third space between the first plate and the second plate that has a third temperature between the first temperature and the second temperature and is in a vacuum state;
 a support comprising at least a pair of support plates that maintain a distance between the first plate and the second plate;
 a thermal insulator comprising at least one radiation resistance sheet provided between the pair of support plates to reduce heat transfer between the first plate and the second plate; and
 an exhaust port through which a gas in the third space is exhausted, wherein an edge of at least one of the pair of support plates extends past the radiation resistance sheet.

2. The vacuum adiabatic body according to claim 1, wherein at least two radiation resistance sheets are provided, and a spacing block is provided between the radiation resistance sheets.

3. The vacuum adiabatic body according to claim 1, wherein the second temperature is a room-temperature.

4. The vacuum adiabatic body according to claim 3, wherein the pair of support plates comprise a first support plate that abuts the first plate and a second support plate that abuts the second plate.

5. The vacuum adiabatic body according to claim 4, wherein the second support plate is the same size as the first support plate.

6. The vacuum adiabatic body according to claim 4, wherein the second support plate is larger than the first support plate.

7. The vacuum adiabatic body according to claim 6, wherein a virtual line between an edge of the first support plate and an edge of the second support plate is provided at an angle of 45 degrees with respect to the second support plate.

8. The vacuum adiabatic body according to claim 7, wherein the radiation resistance sheets each comprise:
   at least one first hole through which a first support bar passes that is configured to guide a position of the radiation resistance sheet within the third space; and
   at least one second hole through which a second support bar passes, wherein the at least one second hole is larger than the at least one first hole.

9. The vacuum adiabatic body according to claim 8, wherein a distance from a supporting point at which the first support bar supports the radiation resistance sheet to an edge of the radiation resistance sheet is less than a distance from the supporting point to the virtual line.

10. The vacuum adiabatic body according to claim 9, wherein the edge of the radiation resistance sheet extends by a distance of 10 mm to 15 mm from the supporting point.

11. The vacuum adiabatic body according to claim 1, wherein the radiation resistance sheet has an emissivity less than that of at least one of the first or second plate.

12. A refrigerator comprising:
   a main body having an internal space in which storage goods are stored, wherein the walls of the main body are provided as a vacuum adiabatic body; and
   a door provided to open and close the main body from an external space, wherein, in order to supply a refrigerant into the main body, the refrigerator comprises:
      a compressor compressing the refrigerant;
      a condenser condensing the compressed refrigerant;
      an expander expanding the condensed refrigerant; and
      an evaporator evaporating the expanded refrigerant to dissipate heat, wherein the vacuum adiabatic body comprises:
         a first plate defining at least a portion of a first side of a wall adjacent to the internal space having a first temperature;
         a second plate defining at least a portion of a second side of the wall adjacent to the external space having a second temperature different from the first temperature;
         a seal that seals the first plate and the second plate to provide a third space between the first plate and the second plate that has a temperature between the first temperature and the second temperature and is in a vacuum state;
         two or more supports that contact each other to maintain a volume of the third space;
         a thermal insulator comprising at least one radiation resistance sheet provided in a plate shape within the third space to reduce a heat transfer amount between the first plate and the second plate; and
         an exhaust port through which a gas in the vacuum space part is ejected, wherein each of the supports comprises:
            a first support plate supported by the first plate;
            a second support plate supported by the second plate; and
            at least one bar connecting the first support plate to the second support plate, wherein the bar maintains a distance between the first support plate and the second support plate, and at least one of the first support plate or the second support plate extends past the radiation resistance sheet.

13. The refrigerator according to claim 12, wherein a first end of a first side of a first support comes into contact with the first support plate of a second support.

14. The refrigerator according to claim 13, wherein the first end of the first side of the first support comprises a first end of the first support plate of the first support and a first end of the second support plate.

15. The refrigerator according to claim 12, wherein a first end of a first side of a first support comes into contact with a first end of a first side of the second support.

16. The refrigerator according to claim 12, wherein the two or more supports contact the same first support plate.

17. A vacuum adiabatic body comprising:
   a first plate defining at least a portion of a first side of a wall adjacent to a first space having a first temperature;
   a second plate defining at least a portion of a second side of the wall adjacent to a second space having a second temperature different than the first temperature;
   a seal that seals the first plate and the second plate to provide a third space between the first plate and the second plate that has a third temperature between the first temperature and the second temperature and is in a vacuum state;
   a support comprising at least a pair of support plates that maintain a distance between the first plate and the second plate and a bar connecting the at least one pair of support plates to each other;
   a thermal insulator comprising at least one radiation resistance sheet provided between the pair of support plates to reduce heat transfer between the first plate and the second plate; and
   an exhaust port through which a gas in the third space is ejected, wherein, when the radiation resistance sheet is deformed, at least one of the pair of support plates extends past the radiation resistance sheet, and a first hole into which the bar is inserted is defined in the radiation resistance sheet.

18. The vacuum adiabatic body according to claim 17, further comprising:
   a seating rib provided on the support plate; and
   an insertion groove provided in the radiation resistance sheet and configured to allow the seating rib to pass therethrough.

19. The vacuum adiabatic body according to claim 18, wherein the insertion groove is provided at an edge of the radiation resistance sheet.

20. The vacuum adiabatic body according to claim 17, wherein at least two or more supports are provided, and an end of a first support comes into contact with a first support plate of a second support.

* * * * *